US012775791B2

(12) United States Patent
Mancuso et al.

(10) Patent No.: US 12,775,791 B2
(45) **Date of Patent: *Oct. 27, 2026**

(54) GENERATING COACHING INSIGHTS USING LARGE LANGUAGE MODELS TO IMPROVE PULSE STATUS

(71) Applicant: Dropbox, Inc., San Francisco, CA (US)

(72) Inventors: Devin Mancuso, San Francisco, CA (US); Bonita Leung, Brooklyn, NY (US); Theo Richardson, Toronto (CA); Udara Jayawardena, Toronto (CA)

(73) Assignee: Dropbox, Inc., San Francisco, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 18/925,755

(22) Filed: Oct. 24, 2024

(65) Prior Publication Data

US 2025/0384208 A1 Dec. 18, 2025

Related U.S. Application Data

(63) Continuation of application No. 18/744,229, filed on Jun. 14, 2024, now Pat. No. 12,135,937.

(51) Int. Cl.
*G06F 40/20* (2020.01)

(52) U.S. Cl.
CPC .................................... *G06F 40/20* (2020.01)

(58) Field of Classification Search
CPC ...................................................... G06F 40/20
See application file for complete search history.

(56) References Cited

U.S. PATENT DOCUMENTS

| | | | | |
|---|---|---|---|---|
| 11,307,881 | B1 | 4/2022 | Bhutani et al. | |
| 12,645,476 | B1 * | 6/2026 | Pagl | G06F 9/45558 |
| 2017/0140285 | A1 | 5/2017 | Dotan-Cohen et al. | |
| 2019/0009133 | A1 | 1/2019 | Mettler May | |
| 2019/0355043 | A1 * | 11/2019 | Swierk | G10L 15/22 |
| 2021/0043099 | A1 * | 2/2021 | Du | G06N 3/006 |
| 2021/0089598 | A1 | 3/2021 | Jeong et al. | |
| 2021/0117214 | A1 | 4/2021 | Presant et al. | |

(Continued)

FOREIGN PATENT DOCUMENTS

| | | | | |
|---|---|---|---|---|
| IN | 202341066012 A | | 10/2023 | |
| WO | WO-2021040089 A1 | * | 3/2021 | G06F 16/55 |

OTHER PUBLICATIONS

Notice of Allowance for U.S. Appl. No. 18/744,229 mailed on Aug. 22, 2024, 9 pages.

(Continued)

*Primary Examiner* — Mohammad K Islam
(74) *Attorney, Agent, or Firm* — Keller Preece PLLC

(57) ABSTRACT

The present disclosure is directed toward systems, methods, and non-transitory computer readable media for generating and providing coaching insights using a large language model to process coaching prompts. In some embodiments, the disclosed systems generate a coaching prompt from a knowledge graph encoding data from data sources, such as an observation layer and a world state. The disclosed systems also determine a pulse status of a user account to inform a coaching prompt. Additionally, the disclosed systems provide the coaching prompt to a large language model for generating a coaching insight to improve the pulse status.

20 Claims, 15 Drawing Sheets

(56) References Cited

U.S. PATENT DOCUMENTS

| | | | | |
|---|---|---|---|---|
| 2021/0295736 | A1* | 9/2021 | Baker | G06F 3/0482 |
| 2021/0383289 | A1 | 12/2021 | Dmitriev et al. | |
| 2022/0292423 | A1 | 9/2022 | Ash et al. | |
| 2023/0144461 | A1 | 5/2023 | Perumalla et al. | |
| 2023/0385740 | A1 | 11/2023 | Karlberg et al. | |
| 2023/0410022 | A1 | 12/2023 | Childress | |
| 2023/0421515 | A1 | 12/2023 | Ramirez et al. | |
| 2024/0055099 | A1 | 2/2024 | Greenberg et al. | |
| 2024/0112144 | A1 | 4/2024 | Koslow et al. | |
| 2024/0144089 | A1* | 5/2024 | Britt | G06F 40/216 |
| 2024/0177171 | A1* | 5/2024 | Thangappa | G06Q 30/016 |
| 2024/0241897 | A1 | 7/2024 | Wang et al. | |
| 2024/0354641 | A1 | 10/2024 | Miller et al. | |
| 2025/0068662 | A1 | 2/2025 | Choi et al. | |
| 2025/0335955 | A1 | 10/2025 | Muthu et al. | |

OTHER PUBLICATIONS

Non-Final Office Action from U.S. Appl. No. 18/744,216, mailed Dec. 3, 2025, 18 pages.
Non-Final Office Action from U.S. Appl. No. 18/744,216, mailed on May 9, 2025, 19 pages.
Final Office Action from U.S. Appl. No. 18/744,216 mailed Feb. 13, 2025, 15 pages.
Final Office Action from U.S. Appl. No. 18/744,216, mailed on Sep. 25, 2025, 18 pages.
Non-Final Office Action from U.S. Appl. No. 18/744,216, mailed Nov. 8, 2024, 15 pages.
Final Office Action from U.S. Appl. No. 18/744,216 mailed on Mar. 12, 2026, 19 pages.

* cited by examiner

GENERATING COACHING INSIGHTS USING LARGE LANGUAGE MODELS TO IMPROVE PULSE STATUS

CROSS-REFERENCE TO RELATED APPLICATIONS

The present application is a continuation of U.S. application Ser. No. 18/744,229, filed on Jun. 14, 2024. The aforementioned application is hereby incorporated by reference in its entirety.

BACKGROUND

Advancements in computing devices and networking technology have given rise to a variety of innovations in digital assistant software, from applications that predictively auto-complete digital content to programs that evaluate user account productivity. For example, existing systems can detect interactions with content items and can determine general measures of productivity based on the interactions over time. Despite these advances, however, existing digital content systems continue to suffer from a number of disadvantages, particularly in terms of flexibility and accuracy.

As just suggested, some existing systems are inflexible. In particular, many existing systems are rigidly fixed to input signals from a single computer application (e.g., the application running the system software) to determine productivity of a user account. Moreover, the signals available in many existing computer applications mainly target user interactions relative to particular content items over time. Because some existing systems are so fixed to express, limited-scope input within a single application, such systems cannot adapt to other signals outside of the single computer application, let alone contextual data relating to the physical and/or digital environment of the user account.

Due at least in part to their inflexibility, many existing systems are also inefficient. To elaborate, because existing systems are often designed solely and specifically to monitor user interaction within a single computer application, some existing systems do not natively include functionality for generating predictions based on other data, such as data relating to the physical surroundings of a client device, data regarding content displayed on the client device, and/or data defining content items stored for a user account. Consequently, such existing systems often generate inaccurate, or at least underinformed, predictions regarding a user account's productivity. Indeed, predicting user account productivity is only as accurate as the data providing the basis for the prediction. Thus, without more informative data providing a more complete picture, current systems are limited to inaccurate predictions of user account productivity.

SUMMARY

This disclosure describes one or more embodiments of systems, methods, and non-transitory computer readable storage media that provide benefits and/or solve one or more of the foregoing and other problems in the art. For instance, the disclosed systems generate coaching prompts for providing to a large language model based on a knowledge graph informed by unique data sources. Specifically, the disclosed systems can generate the knowledge graph from an observation layer data source that tracks and encodes data displayed on a client device over time, including content items presented across various applications. The disclosed systems can also generate the knowledge graph from a world state data source that tracks and encodes environmental metrics defining physical surroundings of a client device as well as client device metrics indicating internal functioning of the device according to various device sensors. Using data encoded in the knowledge graph, the disclosed systems can thus generate a coaching prompt that captures data from the observation layer, the world state, and/or other data sources.

The disclosed systems also generate coaching insights from the coaching prompts. For example, the disclosed systems determine a pulse status for a user account to inform a coaching prompt along with unique data sources. In some embodiments, the disclosed systems determine the pulse status from express pulse signals, from executable processes extracted from a target objective, and/or from application data gleaned by one or more connectors to external computer applications. The disclosed systems can also provide the coaching prompt to a large language model to generate a coaching insight that includes a recommended action for improving a pulse status. Additionally, the disclosed systems can also generate and provide a coaching insight interface that includes selectable elements for reviewing coaching insights and corresponding memories captured from data associated with a client device.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

Figure 1:
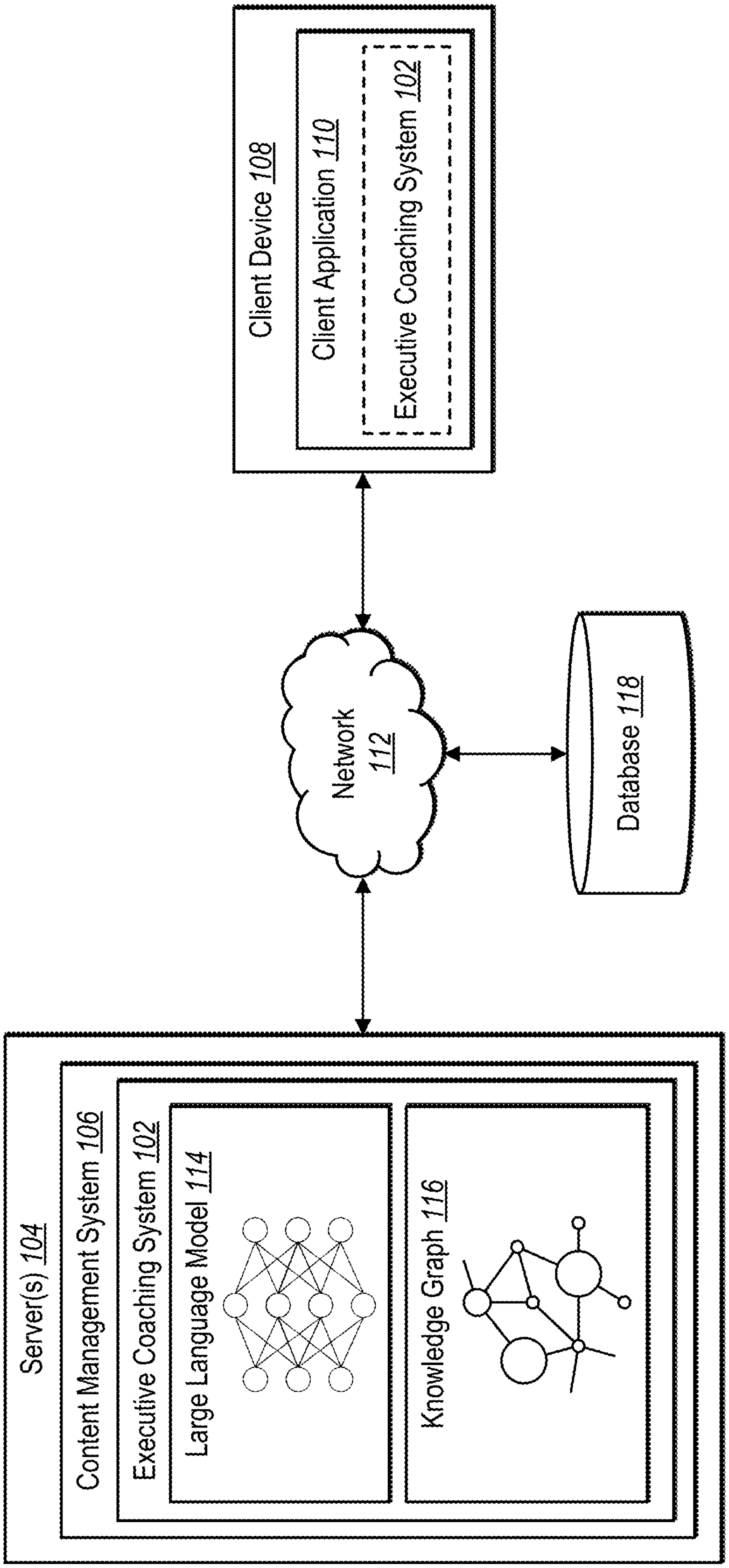
FIG. 1 illustrates a schematic diagram of an example environment of an executive coaching system in accordance with one or more embodiments.

This disclosure describes one or more embodiments of an executive coaching system that generates and provides intelligent coaching insights using a large language model to process coaching prompts. For example, the executive coaching system generates a coaching prompt to include language informed by a knowledge graph that encodes data from unique data sources. Such data sources include an observation layer data source, a world state data source, connectors, and user interaction. In some embodiments, the executive coaching system generates a coaching prompt to generate coaching insights that lead to accomplishing a target objective. Indeed, the executive coaching system can generate a coaching prompt from data encoded by a dependency map that maps executive process within a target objective to content items stored for a user account. In the same or other embodiments, the executive coaching system generates a coaching prompt to generate a coaching insight that leads to improving a pulse status of a user account.

As indicated above, in some embodiments, the executive coaching system generates a coaching insight from a coaching prompt. In particular, the executive coaching system can provide a coaching prompt to a large language model, whereupon the large language model processes the language of the large language model (which is based on data from the data sources, dependency map, and/or pulse status) to generate a coaching insight that includes a recommended action for improving the pulse status. In addition, the executive coaching system can generate and provide a coaching insight interface that includes selectable elements for reviewing coaching insights and captured moments corresponding to the insights. For instance, the executive coaching system can capture a world state moment indicating device metrics captured by device sensors at a point in time and can provide a coaching insight for improving the pulse status pertaining to the world state moment. As another example, the executive coaching system can capture an observation layer moment indicating digital content displayed on a client device at a point in time and can provide a coaching insight for improving a pulse status pertaining to the observation layer moment.

As mentioned, the executive coaching system can generate a coaching prompt from various data sources. For example, the executive coaching system can determine an observation layer data source that indicates digital content displayed on a client device over time across various application windows. In addition, the executive coaching system can determine a world state data source that defines client device metrics and/or environmental metrics based on sensor readings from client device sensors. The executive coaching system can further generate a knowledge graph that encodes the data from the observation layer data source, the world state data source, and/or other data sources, such as connectors integrating application content ingested from third-party applications.

In some embodiments, the executive coaching system generates a dependency map from a knowledge graph. More specifically, the executive coaching system can generate a dependency map that maps executable processes (decomposed from an overarching target objective) to content items stored for a user account. Indeed, the executive coaching system can extract executable processes from a target objective (defined by the user account) using a context engine. The executive coaching system can further generate a dependency map by mapping the executable processes to content items that contribute or relate to accomplishment of the executable processes. In some cases, the executive coaching system thus generates a coaching prompt based on the information encoded by the dependency map.

As noted, in some embodiments, the executive coaching system determines a pulse status for a user account. In particular, the executive coaching system can determine a pulse status based on express pulse signals (e.g., in response to notifications prompting pulse feedback from a user account), application data from connectors to third-party applications, and/or measuring accomplishment of executable processes extracted from a target objective. The executive coaching system can thus generate a coaching prompt informed by a pulse status (in addition to a data sources and/or a dependency map).

As also mentioned, the executive coaching system can generate a coaching insight from a coaching prompt. For instance, the executive coaching system can provide a coaching prompt to a large language model which processes the language of the coaching prompt (which is based on the data sources, the pulse status, and/or the dependency map) to generate a coaching insight that includes a recommended action for improving the pulse status. In some cases, the executive coaching system generates a coaching insight specific to a particular moment captured from observation layer data, world state data, and/or another data source. In these or other cases, the executive coaching system generates a coaching insight for an ongoing interaction associated with a user account. The executive coaching system can further generate and provide a coaching insight for display (along with visualization of captured moments or ongoing interactions) within a coaching insight interface.

As suggested above, the executive coaching system can provide several improvements or advantages over existing virtual meeting systems. For example, some embodiments of the executive coaching system can improve flexibility over prior systems. As opposed to existing systems that are rigidly fixed to single-application data for predicting productivity of a user account, the executive coaching system has unique access to a wide range of data sources not available to prior systems. For instance, the executive coaching system can access observation layer data sources, world state data sources, and connectors to third-party applications, not to mention stored digital content items within a content management system, as part of informing a coaching prompt. As a result, the executive coaching system can adapt coaching prompts (and resulting coaching insights) to environmental data and client device metrics captured from client device sensors, depicted digital content on a display of a client device, dependency maps for content items stored specifically for a user account, and/or application data ingested via connectors to third-party applications.

Due at least in part to its improved flexibility, the executive coaching system can also improve accuracy over prior systems. For example, by generating coaching insights from such informative contextual data (e.g., the data sources, the pulse status, and the dependency map), the executive coaching system generates coaching insights that are much more precise than those generated by prior systems. Indeed, rather than providing generic suggestions for improving user account productivity (as in prior systems), the executive coaching system can generate specific recommended actions pertaining to captured moments (e.g., world state moments or observation layer moments) and/or ongoing user account interactions. The executive coaching system has access to data unavailable to (and not generated by) prior systems (e.g., world state data, connector data, stored content items, and/or observation layer data), and as a result, the executive coaching system can generate incisive, accurate coaching insights at levels unattainable using prior systems.

As illustrated by the foregoing discussion, the present disclosure utilizes a variety of terms to describe features and benefits of the executive coaching system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

Additionally, as used herein, the term "data source" refers to a server location, a collection of server locations, or an ongoing stream of data that stores or includes computer data for informing a knowledge graph. For example, a data source includes information stored for a user account within a content management system. A data source can store or include information from client device sensors defining client device metrics and/or environmental metrics of the client device. A data source can also include observation layer data captured from content depicted on a client device.

Example data sources include an "observation layer data source" (or simply "observation layer") that stores or streams data from content depicted on a client device. For instance, an observation layer data source includes data indicating pixel values at various pixel locations on a device display at a particular timestamp, in addition to application data for the various application windows depicting the content reflected by the pixel values. In addition, a "world state data source" (or simply "world state") refers to client device data captured by client device sensors (across a single device or across multiple devices in an area), such as an inertial measurement unit (IMU), temperature sensors, light sensors, cameras, microphones, touch sensors, and/or GPS sensors. World state data includes client device metrics indicating operating system settings and performance and physical measurements from device sensors (e.g., internal device temperature, fan speed, and screen brightness). World state data also includes environmental metrics indicating information about physical surroundings of a client device, such as proximity of a user to the device and/or lighting conditions (e.g., indoors or outdoors) of a client device. Additional data sources included user interaction with content items and software connectors ingesting application data from external, third-party computer applications.

As used herein, the term "connector" refers to a computer code segment, application, or program that retrieves or extracts features that define information from user-account-facing applications, such as digital calendars, video call applications, email applications, text messaging applications, and other applications. In some cases, a connector is as described by Vasanth Krishna Namasivayam et al. in U.S. patent application Ser. Nos. 18/478,061 and 18/478,066, titled GENERATING AND MAINTAINING COMPOSITE ACTIONS UTILIZING LARGE LANGUAGE MODELS, filed Sep. 29, 2023, both of which is incorporated herein by reference in their entireties.

Additionally, as used herein, the term "large language model" refers to a set of one or more machine learning models trained to perform computer tasks to generate or identify computing code and/or data in response to an event generation prompt (e.g., user interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate or identify computing code and/or data based on various contextual data, including information from historical user account behavior.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., communication effectivity scores and/or video call effectiveness scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a large language model.

As mentioned, in some embodiments, the executive coaching system generates a coaching prompt from data sources, a pulse status, and a dependency map. As used herein, the term "coaching prompt" refers to a string of one or more characters interpretable by a large language model to generate a coaching insight. A coaching prompt can include language derived from or defining information extracted from a dependency map, a pulse status, and/or one or more data sources. In some cases, a coaching prompt refers to computer code or computer instructions interpretable by a large language model.

Relatedly, as used herein the term "pulse status" refers to an indication or a metric defining a state or status of a user account. For example, a pulse status refers to a status of productivity toward accomplishing a target objective and/or an executable task that is part of a target objective. In addition to a numerical score, a pulse status can also include a text description or explanation of the numerical score to as to inform a large language model of the rationale behind the number. In some cases, a pulse status indicates mood information generated by a large language model from a pulse status prompt that includes language indicating a mood of a user account. For instance, a pulse status prompt includes information from interactions of a user account via email, video calls, or other messaging platforms based on tone, quantity, and/or frequency of communication. Additionally, a pulse status prompt can include language generated based on express pulse signals, such as input entered in response to a pulse update notification or a reaction to a content item. Accordingly, a pulse status generated by a large language model from a pulse status prompt indicates not only a measure of productivity, but also reflects mood information of a user account.

Along these lines, as used herein the term "coaching insight" refers to an output of a large language model based on processing a coaching prompt. A coaching insight can include a recommended action for improving a pulse status of a user account. In some cases, a coaching insight also includes or accompanies moment data captured from one or more data sources, including a world state moment or an observation layer moment.

Along these lines, the term "moment" refers to a state of computer data captured at a point in time for a user account where the data is used to inform a coaching prompt for generating a coaching insight relating to the moment. Relatedly, as used herein the term "world state moment" refers to a moment indicated or defined by a world state data source indicating client device metrics and/or environmental metrics. Similarly, as used herein the term "observation layer moment" refers to a moment captured or defined by observation layer data, including content displayed on a client device at a point in time. Likewise, a "connector moment" refers to a moment indicating or defined by application data captured via one or more external applications as indicated by a connector data source.

As mentioned, the executive coaching system can determine a target objective for a user account and can decompose or break down the target objective into executable processes that, when accomplished together, achieve the target objective. As used herein, the term "target objective" (or "predefined objective") refers to an objective expressed by or determined for a user account. Example target objectives include learning a language, finishing a project by a defined date, reserving evenings for family time, improving average pulse status every month for the next year, or meeting a set number of new people in the company by a certain date. Relatedly, as used herein the term "executable process" refers to a computer process that is executable by a program or a computer application and that makes up a part of a target objective. For example, an executable process includes one or more computer code segments executable to generate a content item, communicate with a user account, or move data from one server location to another as part of accomplishing an overarching target objective.

As indicated, the executive coaching system can break down a target objective into executable processes using a context engine. Indeed, the executive coaching system can utilize a context engine as described in U.S. patent application Ser. No. 18/303,496 titled GENERATING MULTI-ORDER TEXT QUERY RESULTS UTILIZING A CONTEXT ORCHESTRATION ENGINE, filed Apr. 28, 2023, and U.S. patent application Ser. No. 18/482,716 titled CUSTOM INTERPRETER FOR EXECUTING COMPUTER CODE GENERATED BY A LARGE LANGUAGE MODEL, filed Oct. 6, 2023, both of which are hereby incorporated by reference in their entireties. Using the context engine, the executive coaching system generates or determines executable processes, and from the executable processes the executive coaching system further generates a dependency map. As used herein, the term "dependency map" refers to a data structure defining or encoding relationships between content items and executable processes extracted or decomposed from a target objective. For instance, a dependency map includes mappings between specific executable processes and content items stored for a user account in a content management system, where the content items include information pertaining to or involved with accomplishing the executable processes. In some cases, a dependency map can also map data from other data sources (e.g., observation layer, world state, and connectors) to executable processes extracted from a target objective.

Additional detail regarding the executive coaching system will now be provided with reference to the figures. For example, FIG. 1 illustrates a schematic diagram of an example system environment for implementing an executive coaching system 102 in accordance with one or more implementations. An overview of the executive coaching system 102 is described in relation to FIG. 1. Thereafter, a more detailed description of the components and processes of the executive coaching system 102 is provided in relation to the subsequent figures.

As shown, the environment includes server(s) 104, a client device 108, a database 118, and a network 112. Each of the components of the environment can communicate via the network 112, and the network 112 may be any suitable network over which computing devices can communicate. Example networks are discussed in more detail below in relation to FIGS. 13-14.

As mentioned above, the example environment includes client device 108. The client device 108 can be one of a variety of computing devices, including a smartphone, a tablet, a smart television, a desktop computer, a laptop computer, a virtual reality device, an augmented reality device, or another computing device as described in relation to FIGS. 13-14. The client device 108 can communicate with the server(s) 104 and/or the database 118 via the network 112. For example, the client device 108 can receive user input from a user interacting with the client device 108 (e.g., via the client application 110) to, for instance, access, generate, modify, or share a content item, to collaborate with a co-user of a different client device, or to select a user interface element. In addition, the executive coaching system 102 on the server(s) 104 can receive information relating to various interactions with content items and/or user interface elements based on the input received by the client device 108.

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a coaching insight user interface for depicting coaching insights and corresponding moment data for improve a pulse status of a user account.

As illustrated in FIG. 1, the example environment also includes the server(s) 104. The server(s) 104 may generate, track, store, process, receive, and transmit electronic data, such as digital content items, pulse status data, data source data, dependency map data, interface elements, interactions with digital content items, interactions with interface elements, and/or interactions between user accounts or client devices. For example, the server(s) 104 may receive data from the client device 108 in the form of a selection of a particular content item relating to a certain topic. In addition, the server(s) 104 can transmit data to the client device 108 in the form of a content item, a recommended action, a pulse status score, and/or a captured moment corresponding to the pulse status. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and/or other types of servers.

As shown in FIG. 1, the server(s) 104 can also include the executive coaching system 102 as part of a content management system 106. The content management system 106 can communicate with the client device 108 to perform various functions associated with the client application 110 such as managing user accounts, generating and providing coaching insights, managing content items, and facilitating user interaction with the content collections and/or content items. Indeed, the content management system 106 can include a network-based smart cloud storage system to manage, store, and maintain content items and related data (including video call data) across numerous user accounts, including user accounts in collaboration with one another. In some embodiments, the executive coaching system 102 and/or the content management system 106 utilize the database 118 to store and access information such as digital content items and/or the knowledge graph 116.

As also illustrated in FIG. 1, the executive coaching system 102 can include a knowledge graph 116. In particular, the knowledge graph 116 can store or encode relationship information to define relationships between user accounts and content items within the content management system 106 (and/or housed at other server locations). From the knowledge graph 116, the executive coaching system 102 can generate or identify relatedness between content items, between user accounts, and/or between content items and user accounts. For instance, the executive coaching system 102 can determine observation layer data, world state data, connector data, and/or user interaction data to form and update nodes and edges within the knowledge graph 116.

As further illustrated in FIG. 1, the executive coaching system 102 includes a large language model 114. In particular, the large language model 114 can process a coaching prompt generated from the knowledge graph 116. Indeed, the large language model 114 processes the coaching prompt to generate a coaching insight that includes a recommended action based on the data sources informing the knowledge graph 116, in addition to other data captured by a coaching prompt, including pulse status and dependency map data.

Although FIG. 1 depicts the executive coaching system 102 located on the server(s) 104, in some implementations, the executive coaching system 102 may be implemented by (e.g., located entirely or in part) on one or more other components of the environment. For example, the executive coaching system 102 may be implemented by the client device 108, and/or a third-party device. For example, the client device 108 can download all or part of the executive coaching system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the executive coaching system 102, bypassing the network 112. In addition, the environment can include the database 118 located external to the server(s) 104 (e.g., in communication via the network 112) or located on the server(s) 104 and/or on the client device 108. Further, the large language model 114 can be located on the server(s) 104 as part of the content management system 106 or the executive coaching system 102, or else can be located external to the server(s) 104 at another network location accessible by the executive coaching system 102.

Figure 2:
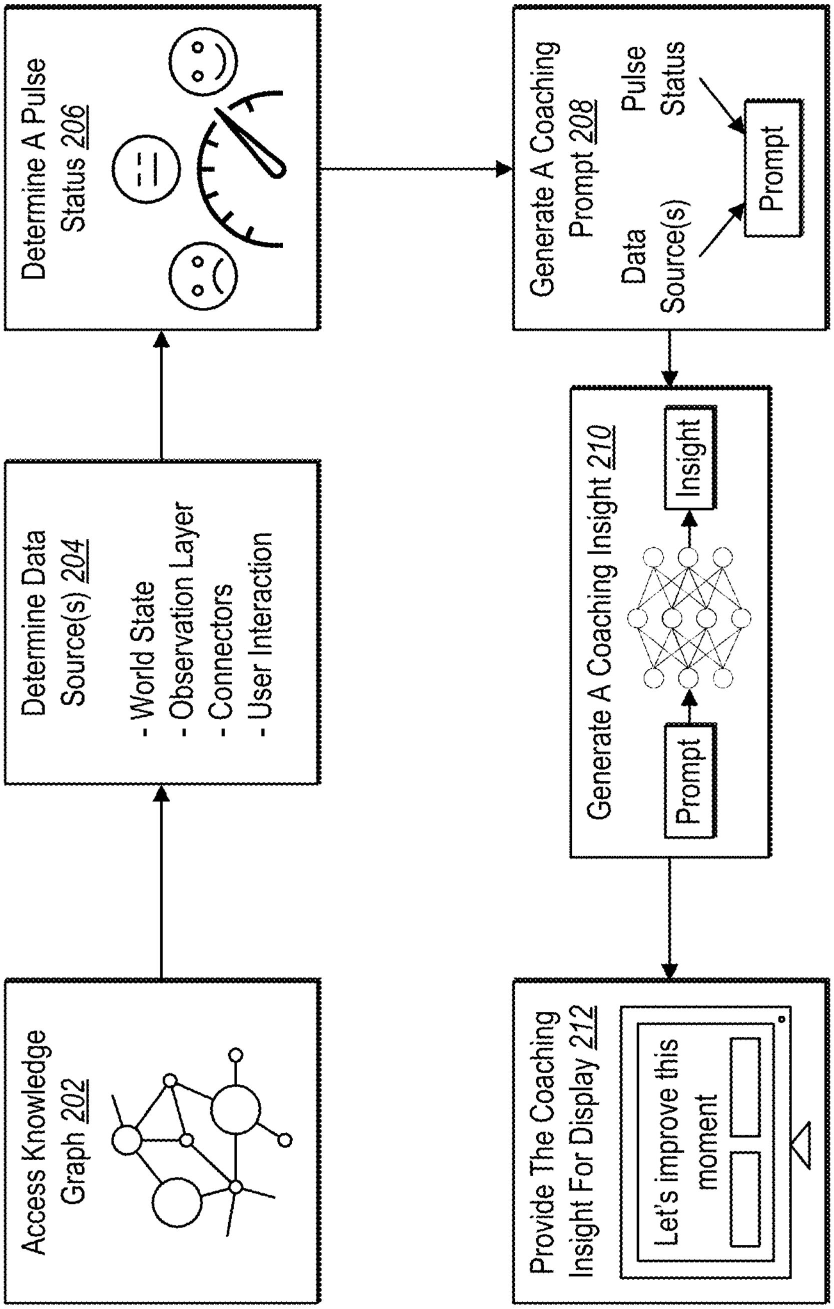
FIG. 2 illustrates an example overview of generating and providing coaching insights in accordance with one or more embodiments.

As mentioned above, the executive coaching system 102 can generate a coaching insight from a coaching prompt. In particular, the executive coaching system 102 can generate a coaching prompt based on data encoded in a knowledge graph from various data sources, as well as pulse status data and/or dependency map data. FIG. 2 illustrates an example overview for generating a coaching insight from a coaching prompt in accordance with one or more embodiments. Additional detail regarding the various acts and processes introduced in FIG. 2 is provided thereafter with reference to subsequent figures.

As illustrated in FIG. 2, the executive coaching system 102 performs an act 202 to access a knowledge graph (e.g., the knowledge graph 116). In particular, the executive coaching system 102 accesses a knowledge graph that includes nodes and edges defining relationships among user accounts and content items stored in the content management system 106. In some embodiments, as described in further detail below, the executive coaching system 102 generates and/or modifies the knowledge graph based on data from one or more data sources.

Along these lines, as also illustrated in FIG. 2, the executive coaching system 102 performs an act 204 to determine one or more data sources. More specifically, the executive coaching system 102 determines or identifies data sources that define or inform the nodes and edges within the knowledge graph, thereby impacting which nodes connect to one another, the distance between nodes, the lengths of edges, and/or the degrees of removal between nodes. Such data sources include an observation layer data source, a world state data source, a connector data source, and a user interaction data source. Thus, the executive coaching system 102 generates and modified nodes and edges within the knowledge graph according to the data sources.

As further illustrated in FIG. 2, the executive coaching system 102 performs an act 206 to determine a pulse status. In particular, the executive coaching system 102 determines a pulse status for a user account that indicates a measure of productivity toward a target objective and/or toward an executable process that is part of a target objective. In some cases, the pulse status also or alternatively indicates a mood associated with a user account. As explained in further detail below, the executive coaching system 102 can determine the pulse status based on express pulse signals, application data from one or more connectors indicating tone, frequency, and/or quantity of digital communications, and/or by generating a pulse status prompt to provide to a large language model to generate a predicted pulse status.

Additionally, the executive coaching system 102 performs an act 208 to generate a coaching prompt. The executive coaching system 102 generates the coaching prompt based on the pulse status and/or the data sources informing the knowledge graph. To elaborate, the executive coaching system 102 can generate language or text reflecting the pulse status of the user account (e.g., using a large language model to process a pulse status prompt) and can further generate language or text from one or more data sources associated with the user account. In some embodiments, the executive coaching system 102 further generates language or text from a dependency map reflecting relationships between content items and executable processes extracted from a target objective of the user account. The executive coaching system 102 can thus combine the text from the pulse status, the data source(s), and/or the dependency map to generate a coaching prompt.

As further illustrated in FIG. 2, the executive coaching system 102 performs an act 210 to generate a coaching insight. In particular, the executive coaching system 102 generates a coaching insight by providing the coaching prompt to a large language model (e.g., the large language model 114). In turn, the large language model processes the coaching prompt to generate a coaching insight that includes one or more recommended actions for improving the pulse status of the user account. Such recommended actions can include interacting differently with particular computer applications, changing an environment of a client device, contacting a particular user account, and/or changing how the client device generates and modified content items, including emails, images, videos, and/or collaborative documents.

Further, the executive coaching system 102 performs an act 212 to provide the coaching insight for display. Indeed, the executive coaching system 102 can generate and provide a coaching insight interface for display, where the coaching insight interface includes one or more coaching insights. Within the coaching insight interface, a coaching insight can include or accompany moment data indicating a moment captured from digital content at a point in time. For instance, the executive coaching system 102 can provide a coaching insight that includes a recommended action for improving a pulse status corresponding to a world state moment, an observation layer moment, a connector moment, or a combination of two or more of the above. Additional detail regarding the generation and display of a coaching insight interface is provided below.

Figure 3:
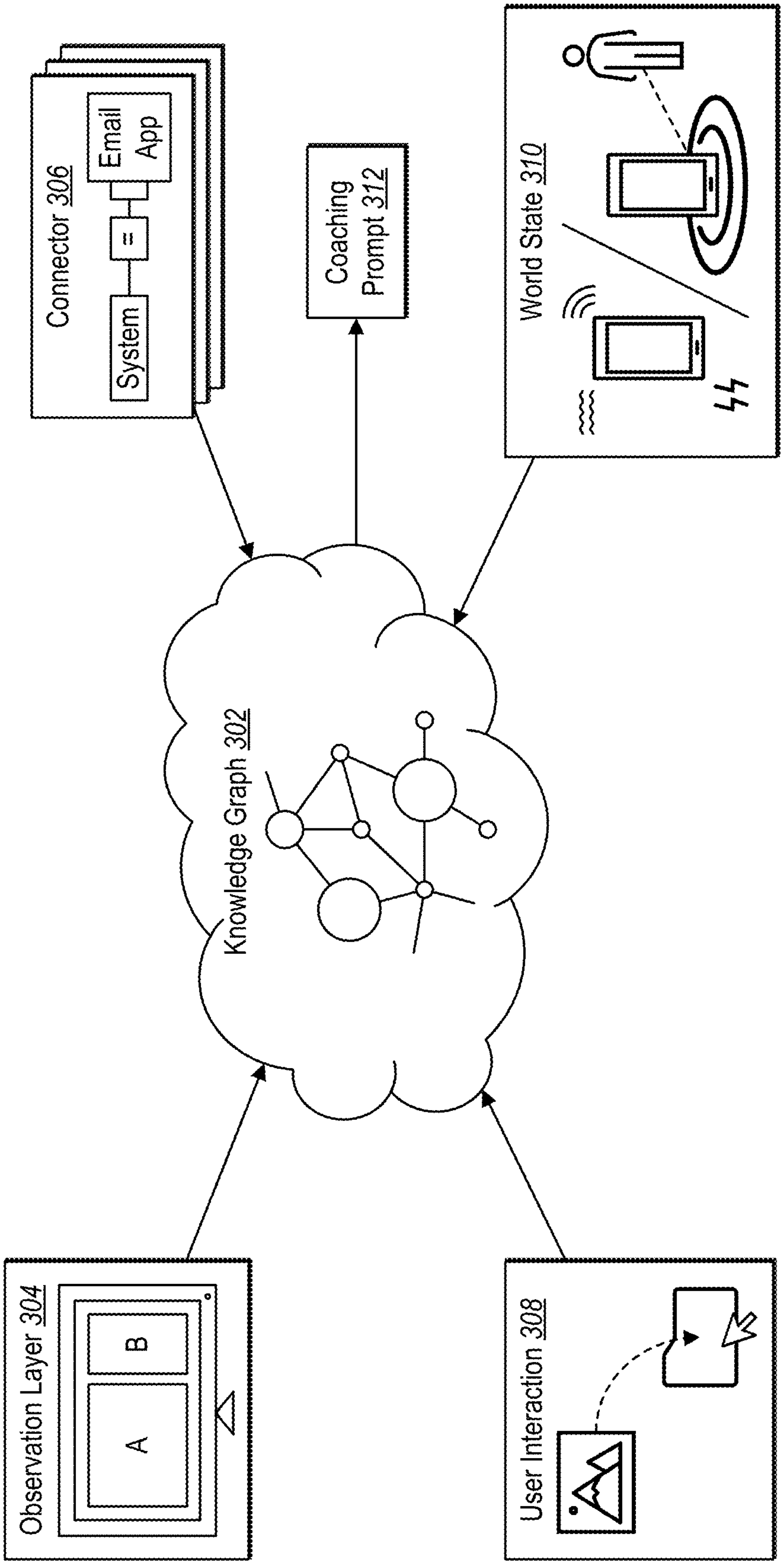
FIG. 3 illustrates an example diagram for generating and utilizing a knowledge graph in accordance with one or more embodiments.

As mentioned above, in certain described embodiments, the executive coaching system 102 can generate and utilize a knowledge graph for generating coaching prompts. In particular, the executive coaching system 102 can generate a knowledge graph that encodes data from various data sources, including an observation layer data source, a connector data source, a world state data source, and a user interaction data source. FIG. 3 illustrates an example diagram for generating and utilizing a knowledge graph in accordance with one or more embodiments.

As illustrated in FIG. 3, the executive coaching system 102 generates the knowledge graph 302 using nodes to represent user accounts and content items and using edges to represent relationships between the nodes (e.g., where shorter distances represent stronger relationships than longer distances). As part of informing the lengths of edges, the sizes of the nodes, and/or the placement of edges connecting nodes, the executive coaching system 102 determines data from an observation layer data source 304. To elaborate, the executive coaching system 102 utilizes an observation layer program that includes computer script which runs to monitor digital content displayed on a client device. Indeed, the observation layer tracks displayed content items, including item identifiers for the displayed items, network locations where the items are stored, and computer applications presenting the various content items. In some cases, the observation layer determines and tracks pixel values at various pixel coordinate locations of a display screen for a client device, including metadata indicating content item identifiers, computer applications, and network locations associated with the various pixels and their values. Additionally, the observation layer tracks changes in displayed content (e.g., in pixel values) over time, determining timestamps associated with displayed content items (and/or pixel values). As shown, the observation layer data source 304 indicates content item A displayed in a first application window in a first position and content item B displayed in a second application window in a second position on the client device.

As also illustrated in FIG. 3, the executive coaching system 102 determines and utilizes a connector data source 306 to inform lengths and connections of nodes and edges in the knowledge graph 302. More particularly, the executive coaching system 102 utilizes computer code of a software connector to ingest data from an external, third-party computer applications. For example, the connector connects a third-party application (e.g., an application hosted and executed outside of the content management system 106 and/or apart from the server(s) 104) to ingest data from the third-party application. In some cases, the connector ingests data as a data stream or in a push-pull fashion based on API requests with the third-party application. For instance, the connector extracts or ingests data indicating interactions or activity with content items using a third-party application, such as an email application, a messaging application, a calendar application, a digital image editing application, or a web browser application. Ingested or extracted data can include identifiers for content items that are selected, modified, deleted, moved, or accessed, along with timestamps of the corresponding actions.

As further illustrated in FIG. 3, the executive coaching system 102 determines a user interaction data source 308 for the knowledge graph 302. For example, the executive coaching system 102 monitors or detects user account behavior within the content management system 106 ecosystem over time. The executive coaching system 102 can monitor accesses, shares, comments, edits, receipts, moves, deletes, new content creations, clips (e.g., generating content items from other content items), and/or other user interactions over time to determine frequencies, recencies, and/or overall numbers of user interactions (of the user account, of collaborating user accounts with the user account, and/or of user accounts within a threshold degree of separation from the user account within the knowledge graph 302) with content items and/or with other user accounts. In some embodiments, the executive coaching system 102 generates, modifies, and maintains the knowledge graph 302 using one or more machine learning models (e.g., neural networks) to predict relationships among content items and user accounts.

In some cases, the executive coaching system 102 generates larger nodes for higher frequencies of interaction with respective content items and user accounts. In these or other cases, the executive coaching system 102 generates edges to have lengths or distances that indicate closeness of relationships between nodes. For example, the executive coaching system 102 generates edges between nodes to reflect frequencies and/or recencies of interaction with respective content items (or topics) and user accounts. In some embodiments, the executive coaching system generates edges to reflect the types of user interactions with the content items and user accounts (e.g., where edits indicate closer relationships than shares, which in turn indicate closer relationships than accesses). Indeed, the executive coaching system 102 can generate the knowledge graph 302 based on combinations of numbers, recencies, frequencies, and types of user interactions by the user account and other user accounts related to (e.g., collaborating with or within the same ontology as) the user account.

Additionally, as shown in FIG. 3, the executive coaching system 102 determines and utilizes a world state data source 310 to generate and update the knowledge graph 302. In particular, the executive coaching system 102 determines a world state of a client device, where the world state include or indicates client device metrics and environment metrics. The executive coaching system 102 can determine client device metrics that indicate operation system settings, such as brightness settings, language settings, fan speed settings, contrast settings, and dark mode settings. The executive coaching system 102 can also utilize operation system function to monitor or detect processor performance and/or memory performance of the client device. In addition, the executive coaching system 102 can determine client device metrics indicating physical measurements from sensors of the client device. Specifically, the executive coaching system 102 utilizes an internal temperature sensor to determine an internal temperature of the client device (e.g., of a processor within the client device).

In addition, the executive coaching system 102 determines environmental metrics of a client device. Indeed, the executive coaching system 102 determines a world state of the client device based on physical measurements or readings from the client device and/or from nearby client devices (e.g., devices within a threshold distance of the client device). For example, the executive coaching system 102 utilizes a camera to determine a brightness of the environment or the physical surroundings of the client device. Additionally, the executive coaching system 102 utilizes the camera to determine a proximity of a user to the client device and/or an engagement with the client device (e.g., eye movement and focus). Further, the executive coaching system 102 utilizes an external temperature sensor of the client device to determine an external temperate of the environment of the client device. Further still, the executive coaching system 102 utilizes a microphone to detect ambient noise in the environment of the client device. In some embodiments, the executive coaching system 102 utilizes a GPS sensor to determine a coordinate location (e.g., latitude, longitude, and/or elevation) of the client device. In some cases, the executive coaching system 102 utilizes the aforementioned sensors of the client device and of client devices within a threshold distance of the client device to build a world state based on average sensor reading values.

Based on the client device metrics and/or the environmental metrics, the executive coaching system 102 can generate a predicted location or state of the client device. For instance, the executive coaching system 102 can predict that the client device is indoors, outdoors, in a bright location, a dark location, a warm location, a cold location, and/or near or far from a user (e.g., by predicting a relative proximity). Based on the world state prediction, the executive coaching system 102 can update or modify nodes and edges in the knowledge graph 302. For example, the executive coaching system 102 can generate a location node for a predicted location of the client device and can generate an edge between the location node and a user account node reflecting a relationship (where a shorter edge indicates a higher probability or degree of confidence that the user of the user account is in the location). In addition, the executive coaching system 102 can modify existing nodes and edges to reflect focus data or engagement with content items in the knowledge graph 302.

As further illustrated in FIG. 3, the executive coaching system 102 can utilize the knowledge graph 302 to generate a coaching prompt 312. More specifically, the executive coaching system 102 can generate the coaching prompt 312 to include language or text describing data from the observation layer data source 304, from the connector data source 306, from the user interaction data source 308, and/or from the world state data source 310. Combining the text from the various data sources together, the executive coaching system 102 generates the coaching prompt 312 to reflect information about a user account and/or a client device for generating an accurate coaching insight specific to such data. As an example, the executive coaching system 102 can generate the coaching prompt 312 to include language indicating a predicted device location, temperature, performance, and proximity to a user, along with selected content items, locations of displayed content items, and/or third-party application usage, all at a particular timestamp.

Figure 4:
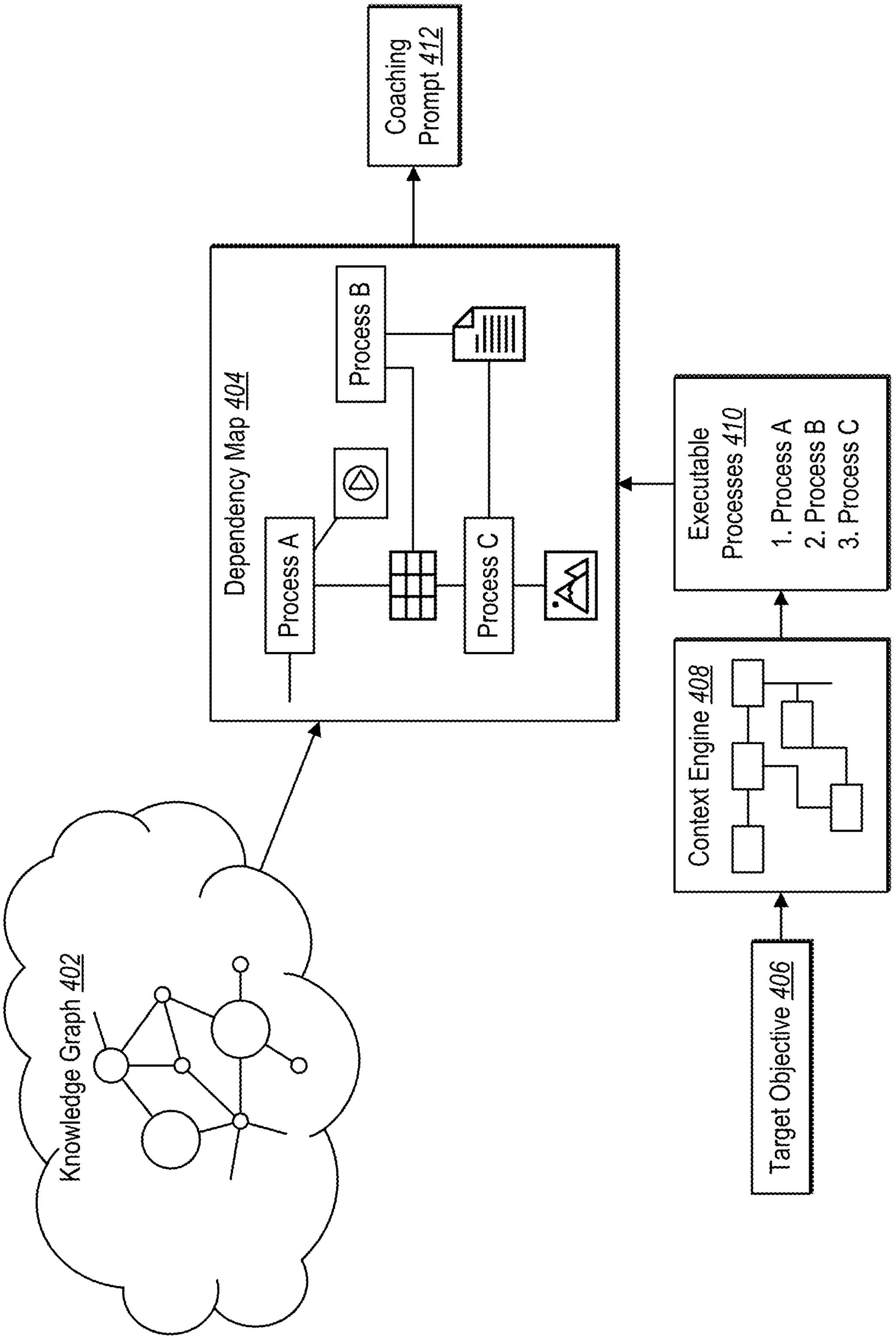
FIG. 4 illustrates an example overview of generating and utilizing a dependency map in accordance with one or more embodiments.

As noted above, in certain embodiments, the executive coaching system 102 generates a coaching prompt based on various data sources, a pulse status, and/or a dependency map. In particular, the executive coaching system 102 generates a coaching prompt to reflect data encoded in a dependency map that links or maps relationships between executable processes and content items stored for a user account. FIG. 4 illustrates an example diagram for generating and utilizing a dependency map in accordance with one or more embodiments.

As illustrated in FIG. 4, the executive coaching system 102 accesses a knowledge graph 402 to identify or determine content items associated with a user account. For example, the executive coaching system 102 determines content items associated with the user account based on the data sources discussed above which define nodes and edges within the knowledge graph 402. In some cases, the executive coaching system 102 determines content items within a threshold relatedness to the user account, such as within a threshold distance or within a threshold degree of separation (e.g., a threshold number of nodes and/or edges separating the account node and an item node).

In addition, the executive coaching system 102 determines a target objective 406 for the user account. To elaborate, the executive coaching system 102 determines the target objective 406 based on typed text via a client device defining the target objective 406. In some cases, the executive coaching system 102 determines the target objective 406 by using a predictive target objective model that generates a prediction for the target objective from data extracted via one or more data sources, such as the user interaction data source. For instance, the target objective model is trained on executive coach data that indicates ground truth target objectives corresponding to particular user accounts and/or data source(s). Thus, the executive coaching system 102 can input user account data and/or data extracted via data sources into the target objective model, whereupon the model predicts the target objective 406 (e.g., based on parameters trained from executives with similar user accounts and/or similar data source data, along with the corresponding ground truth target objectives).

As further illustrated in FIG. 4, the executive coaching system 102 generates or extracts executable processes 410 from the target objective 406. More specifically, the executive coaching system 102 utilizes a context engine 408 to decompose or break down the target objective 406 into a set of processes that, when executed, accomplish the target objective. Indeed, the context engine 408 includes computer code or logic to interpret high order queries (e.g., the target objective 406) and break them down into a series of single order tasks or processes (e.g., the executable processes 410). The executive coaching system 102 thus generates the executable processes 410 which include computer processes executable with one or more processors of a client device.

As also illustrated in FIG. 4, the executive coaching system 102 generates a dependency map 404 from the knowledge graph and the executable processes 410. To elaborate, the executive coaching system 102 generates the dependency map 404 by mapping the executable processes 410 to content items in the knowledge graph 402. For example, the executive coaching system 102 determines which content items (and/or corresponding server locations) to access, modify, generate, move, or otherwise interact with to accomplish each of the executable processes 410. The executive coaching system 102 thus generates the dependency map 404 to map Process A to content items involved in the execution of Process A. Likewise, the executive coaching system 102 generates the dependency map 404 to map Process B and Process C to respective content items, some of which are shared among other processes and others of which are unique to the individual processes. In some cases, the dependency map 404 also indicates what types of interactions (and timestamps for when) to perform in relation to which content items for accomplish each respective process of the executable processes 410.

Additionally, the executive coaching system 102 can generate a coaching prompt 412 from the dependency map 404. More particularly, the executive coaching system 102 can generate language or text to include in the coaching prompt 412 based on information encoded in the dependency map 404. For example, the executive coaching system 102 can generate text describing the executable processes 410 and which content items correspond to which of the executable processes 410, as well as what types of actions to perform on the content items and when to perform them to accomplish the executable processes 410.

Figure 5:
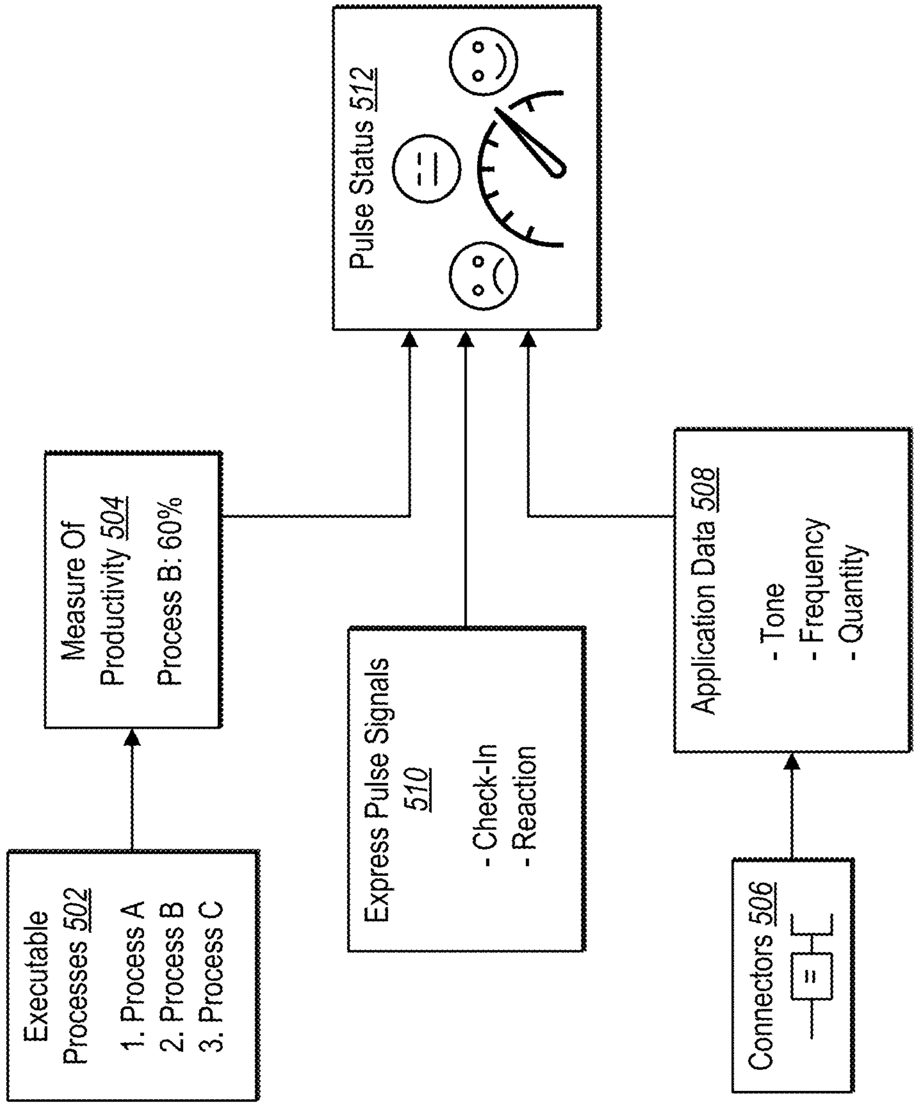
FIG. 5 illustrates an example diagram for determining a pulse status in accordance with one or more embodiments.

As mentioned above, in certain described embodiments, the executive coaching system 102 generates or determines a pulse status to inform a coaching prompt. In particular, the executive coaching system 102 determines a pulse status for a user account based on various factors relating to productivity and/or mood data. FIG. 5 illustrates an example diagram for determining or generating a pulse status in accordance with one or more embodiments.

As illustrated in FIG. 5, the executive coaching system 102 the executive coaching system 102 extracts or generates executable processes 502. As explained, the executive coaching system 102 extracts the executable processes 502 using a context engine to break down a target objective into single-order processes executable (e.g., by a client device and/or a processor of a server) that, when executed, together accomplish the target objective. As shown, the executive coaching system 102 determines a measure of productivity 504 associated with an executable process (or associated with the target objective overall). For instance, the executive coaching system 102 determines a percentage or a proportion of an executable process that is complete at a point in time to generate a measure of productivity (e.g., 60% of Process B). As another example, the executive coaching system 102 determines a proportion of a target objective that is complete by determining a number of completed executable processes from among the set that make up the target objective.

On a related note, the executive coaching system 102 can utilize an overall target objective (e.g., the target objective 406) as a baseline definition for a pulse status—where measures of productivity (e.g., the measure of productivity 504) or mood are determined in relation to the target objective. For instance, the target objective can indicate that a user account wants to be more friendly in interactions with a particular team or that a user account wants to finish a particular project by a target date. The executive coaching system 102 can thus use the information in the target objective to inform the determination of the pulse status 512 based on data indicating how well the user account is doing with regard to accomplishing the target objective.

As also illustrated in FIG. 5, the executive coaching system 102 utilizes connectors 506 to extract or ingest application data 508 from one or more computer applications. To elaborate, the executive coaching system 102 uses a connector that ingests digital content from a third-party application via API calls or other communication protocols to determine user interactions and/or content items used and created via third-party applications external to the server(s) 104. For instance, the connectors 506 ingest content from applications or programs that access and perform processes on content items stored in the content management system 106 but that are hosted or maintained at their own respective servers or locally on a client device.

As shown, the executive coaching system 102 extracts the application data 508 that informs the determination of a pulse status 512. For example, the executive coaching system 102 extracts data indicating created text content, created image content, or other user interactions via third-party applications. The executive coaching system 102 further determines a tone for the created content. In some cases, the executive coaching system 102 utilizes a tone prediction model (e.g., a neural network) that is trained on sample text (and/or sample images or other content) and corresponding ground truth tone scores (e.g., 0 to 1 where low scores reflect negative tones and high scores reflect positive tones). The tone prediction model thus generates a predicted tone score for the application data 508 ingested via the connectors 506. In some embodiments, the executive coaching system 102 uses a heuristic model to generate a tone score associated with content created (or otherwise interacted with) by a user account, where the heuristic model includes computer logic rules for different types of language or content and the scores that correspond to the content. In some cases, the executive coaching system 102 can thus detect, as an indicator of the pulse status 512) circumstances where the tone associated with a user account is different when interacting with a particular co-user account than with other co-user accounts, or with a particular topic as compared to other topics.

In addition to tone, the executive coaching system 102 determines application data 508 that includes frequency and quantity metrics. For example, the executive coaching system 102 determines a frequency of user interaction to create, select, or otherwise interact with content items via third-party applications. Additionally, the executive coaching system 102 determines a quantity of user interactions with content items using third-party applications (e.g., a number of characters typed in a time period or a number of content selections or views in a time period). In some embodiments, the executive coaching system 102 also determines changes in tone, frequency, and/or quantity of application data 508 over time as part of informing the pulse status 512 (e.g., where sudden tone changes or decreases in frequency may indicate a worsening or improving pulse status).

The executive coaching system 102 can also determine application data 508 in the form of timing data, such as response timing and/or time since most recent paid time off (PTO). For example, the executive coaching system 102 can determine patterns or changes in response time of a user account to indicate abnormalities or aberrations in response time which indicate at least some measure of the pulse status 512. In addition, the executive coaching system 102 can determine patterns of PTO for a user account and can detect abnormalities or aberrations in PTO timing as indications of the pulse status 512. In some cases, objective measures of time elapsed since most recent PTO can also indicate the pulse status 512 of a user account.

In some embodiments, the application data 508 includes context switching data. For example, the executive coaching system 102 monitors (e.g., through the observation layer 304) interactions for changing between interfaces or applications. The executive coaching system 102 can monitor context switching for a user account over time to establish patterns and can further detect abnormalities or aberrations in the speed or frequency of context switching. In some cases, the executive coaching system 102 applies different thresholds for detecting the aberrations, such as during a video call or in other situations. If the executive coaching system 102 detects a higher-than-normal frequency of changing windows during a video call, the executive coaching system 102 may determine that the context switching is impacting, or indicative of, the pulse status 512.

As further illustrated in FIG. 5, the executive coaching system 102 determines express pulse signals 510 to inform the pulse status 512. For instance, the executive coaching system 102 determines user interactions that expressly define or relate to the pulse status 512 of the user account. In some cases, the executive coaching system 102 generates and provides a check-in notification prompting a pulse status input from a user account, such as a typewritten description of a mood or pulse or a selection of a reaction element (e.g., a thumbs up or a thumbs down). In some embodiments, the executive coaching system 102 generates and provides the pulse check-ins on a periodic basis.

In some embodiments, the executive coaching system 102 determines pulse signals in the form of glucose monitoring and/or sleep monitoring data. For example, the executive coaching system 102 utilizes a connector or an API to ingest data from a wearable device that monitors heartbeat, pulse oximetry, and/or sleep data. Based on the extracted device data the executive coaching system 102 can inform the pulse status 512 as impacted by high/low blood sugar, variations in sleep patterns, and/or variations in other biometrics such as heartbeat and pulse oximetry.

As shown, the executive coaching system 102 combines various pulse status signals to generate or determine the pulse status 512. In particular, the executive coaching system 102 combines the measure of productivity 504, the express pulse signals 510, and/or the application data 508 to determine the pulse status 512. In some cases, the executive coaching system 102 generates a weighted combination of the pulse signals, weighting the express pulse signals 510 with a largest weight, the measure of productivity 504 with a middle weight, and the application data 508 with a smallest weight. Within the application data 508, the executive coaching system 102 can also assign sub-weights to the tone, frequency, and quantity metrics. Based on the weighted combination of the various signals, the executive coaching system 102 generates the pulse status 512 as a score (e.g., from 0 to 1 or 0 to 100). The pulse status 512 thus indicates productivity, mood, and/or other factors associated with the user account. In some cases, the pulse status 512 is a numerical score along with an explanation of the numerical score to inform a large language model of the meaning or rationale behind the number.

Figure 6:
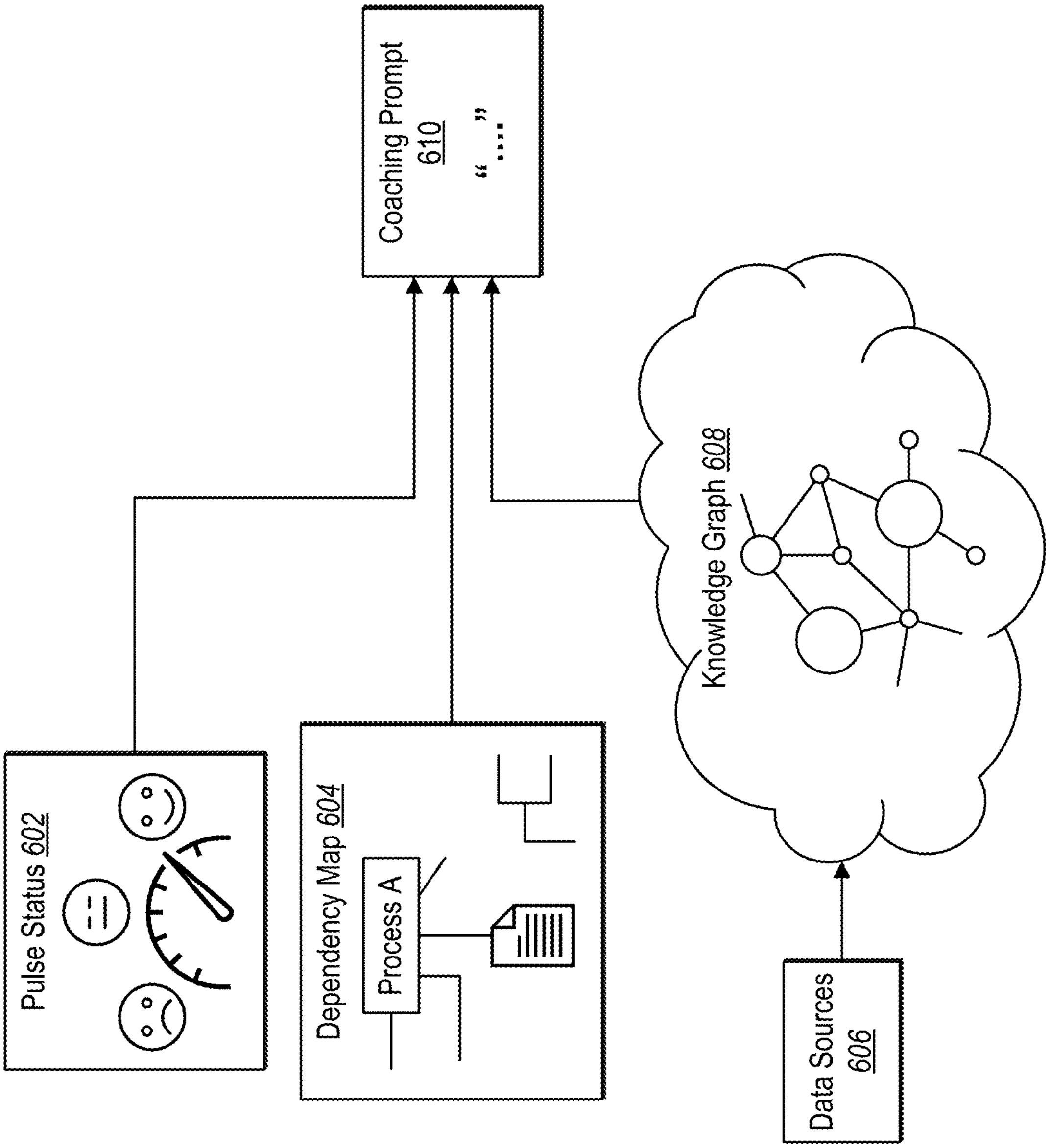
FIG. 6 illustrates an example diagram for generating a coaching prompt in accordance with one or more embodiments.

As indicated above, in certain described embodiments, the executive coaching system 102 generates a coaching prompt from multiple data types. In particular, the executive coaching system 102 generates a coaching prompt from a pulse status, a dependency map, and/or a knowledge graph encoding data sources discussed above. FIG. 6 illustrates an example diagram for generating a coaching prompt in accordance with one or more embodiments.

As illustrated in FIG. 6, the executive coaching system 102 generates a coaching prompt 610 from a pulse status 602. For example, the executive coaching system 102 generates language or text to reflect the pulse status 602, as determined based on the signals described above. In some embodiments, the pulse status 602 represents a collection (or a combination, such as an average) of one or more pulse statuses over a timer period. In some cases, the executive coaching system 102 utilizes a prompt generation model (e.g., a neural network) to generate text that reflects or describes the pulse status 602 in words. Indeed, the prompt generation model can include parameters trained based on sample pulse status inputs and corresponding text phrases that describe the sample pulse statuses. The prompt generation model can thus generate the coaching prompt 610 to include text describing the pulse status 602.

As also illustrated in FIG. 6, the executive coaching system 102 generates the coaching prompt 610 from a dependency map 604. In particular, the executive coaching system 102 generates language or text describing or reflecting the relationships between executable processes and content items. For example, the executive coaching system 102 utilizes a prompt generation model to generate text that describes data encoded in the dependency map 604, including which content items correspond to a particular executable process (e.g., Process A), what types of interactions are to be performed on the content items to accomplish the executable process, which applications should be used to perform the interactions, and when the interactions should occur. The executive coaching system 102 thus generates the coaching prompt 610 to include text derived from the dependency map 604.

As further illustrated in FIG. 6, the executive coaching system 102 generates the coaching prompt 610 from a knowledge graph 608. To elaborate, the executive coaching system 102 generates language or text that describes or reflects data encoded in the knowledge graph 608. For instance, the executive coaching system 102 utilizes a prompt generation model to generate text that describes data from the data sources 606, such as text describing world state data (e.g., client device metrics and/or environment metrics), text describing observation layer data, text describing connector data, and/or text describing user interaction data. In some cases, the prompt generation model weights the data sources 606 differently, thus generating different quantities (e.g., character counts) and/or placements of text within the coaching prompt 610 for the world state data source, the connector data source, the observation layer data source, and the user interaction data source. For instance, the executive coaching system 102 generate a first language/text portion for world state data (having a first character count and first placement) and generates a second language/text portion for observation layer data (having a second character count and a second placement) to include in the coaching prompt 610. The executive coaching system 102 thus generates the coaching prompt 610 to include text derived from the knowledge graph 608.

In some embodiments, the executive coaching system 102 generates the coaching prompt 610 based on a combination of the pulse status 602, the dependency map 604, and/or the knowledge graph 608. Indeed, the executive coaching system 102 generates a weighted combination of the various data to generate the coaching prompt 610 as an amalgamation of text from one or more of the pulse status 602, the dependency map 604, and/or the knowledge graph 608. Based on the weighted combination, the executive coaching system 102 determines respective quantities (e.g., character counts) and/or placement of text to include in the coaching prompt 610. For example, the executive coaching system 102 generates pulse status text, dependency map text, and knowledge graph text from each of the respective signals, each with its own character count and placement (e.g., a determining of which text comes before or after another) within the coaching prompt 610. Indeed, the executive coaching system 102 can generate the coaching prompt 610 based on an understanding of how a large language model will process the coaching prompt 610 according to the quantities and placements of text portions for emphasizing various information.

Figure 7:
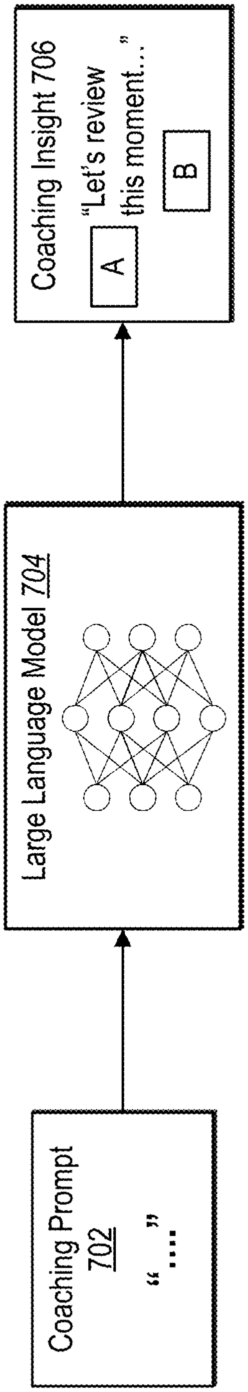
FIG. 7 illustrates an example diagram for generating a coaching insight in accordance with one or more embodiments.

As mentioned above, in certain embodiments, the executive coaching system 102 generates a coaching insight from a coaching prompt. In particular, the executive coaching system 102 generates a coaching insight by using a large language model to process a coaching prompt. FIG. 7 illustrates an example diagram for generating a coaching insight in accordance with one or more embodiments.

As illustrated in FIG. 7, the executive coaching system 102 generates a coaching prompt 702. As described above, the executive coaching system 102 generates the coaching prompt 702 to include text from signals, such as a pulse status, a dependency map, and/or a knowledge graph encoding data from data sources. In addition, the executive coaching system 102 generates the coaching prompt 702 to include language for instructing the large language model 704 to generate a coaching insight 706. For example, the executive coaching system 102 generates instructional language to "Generate an executive coaching insight based on the following information:" where the following information is text from the signals described above.

In some cases, the large language model 704 includes parameters trained or tuned on sample executive coaching data. To elaborate, the executive coaching system 102 trains or tunes the large language model 704 using sample coaching prompts and corresponding ground truth coaching insights (as determined by real-world executives or executive coaches responding to the coaching prompts) for improving a pulse status. For example, the executive coaching system 102 provides sample coaching prompts and corresponding executive coaching insights from executives and executive coaches to the large language model 704, whereupon the large language model 704 learns parameters for generating such insights. In some cases, the large language model 704 includes or represents multiple models, such as large language models trained for different purposes and/or based on different data pertaining to coaching insights and/or coaching prompts. The large language model 704 can thus combine outputs from multiple constituent models that each generate intermediate outputs from respective portions of input data (e.g., a pulse status, a dependency map, and/or a knowledge graph).

Accordingly, as shown, the large language model 704 processes the coaching prompt 702 to generate the coaching insight 706. More particularly, the large language model 704 generates the coaching insight to include a recommended action for improving a pulse status. For instance, the coaching insight 706 includes a suggestion for improving a particular captured moment and/or an ongoing interaction. In some cases, the coaching insight 706 includes world state text, observation layer text, pulse status text, dependency map text, or other text from data sources informing the coaching prompt 702. In addition, the coaching insight 706 can include or accompany additional data corresponding to text included in the coaching prompt 702, such as moment data for various moments.

Indeed, the coaching insight 706 can include observation layer moment data, such as a screenshot of application windows and content items displayed on a client device at a point in time. For example, the executive coaching system 102 can capture an observation layer moment in the form of a screenshot of application windows and content items displayed in the application windows (indicated by pixels values at various pixel locations stored for the moment), along with identifiers for the applications and items displayed. The executive coaching system 102 can capture the observation layer moment at a particular point in time. For instance, the executive coaching system 102 can determine a moment that a pulse status of a user account changed by at least a threshold amount, increased to above a threshold level, and/or decreased below a threshold level. The executive coaching system 102 can thus capture the observation layer moment and can provide the coaching insight 706 based on the observation layer moment. In cases where the executive coaching system 102 provides an observation layer moment with the coaching insight 706, the executive coaching system 102 can weight observation layer data more heavily than other signals in generating the coaching prompt 702.

In some cases, the coaching insight 706 can include world state moment data, such as client device metrics and environmental metrics. For example, the executive coaching system 102 can capture world state moment in the form of operation system settings and/or data indicating physical measurements from sensors of a client device (and/or nearby client devices) to define device performance and/or physical environmental surroundings. The executive coaching system 102 can capture the world state moment at a particular point in time. For instance, the executive coaching system 102 can determine a moment that a pulse status of a user account changed by at least a threshold amount, increased to above a threshold level, and/or decreased below a threshold level. The executive coaching system 102 can thus capture the world state moment and can provide the coaching insight 706 based on the world state moment. In cases where the executive coaching system 102 provides a world state moment with the coaching insight 706, the executive coaching system 102 can weight world state data more heavily than other signals in generating the coaching prompt 702.

In these or other cases, the coaching insight 706 can include connector moment data. For example, the executive coaching system 102 can capture a connector moment in the form of data from third-party applications ingested via one or more connectors. The executive coaching system 102 can capture the connector moment at a particular point in time. For instance, the executive coaching system 102 can determine a moment that a pulse status of a user account changed by at least a threshold amount, increased to above a threshold level, and/or decreased below a threshold level. The executive coaching system 102 can thus capture the connector moment and can provide the coaching insight 706 based on the connector moment. In cases where the executive coaching system 102 provides a connector moment with the coaching insight 706, the executive coaching system 102 can weight connector data more heavily than other signals in generating the coaching prompt 702.

Additionally, the coaching insight 706 can include ongoing moment data for an ongoing user interaction. To elaborate, the executive coaching system 102 can capture an ongoing moment in the form of data reflecting or defining an ongoing interaction associated with a user account, such as an ongoing video call, an ongoing email chain, or an ongoing chat with collaborating accounts. The executive coaching system 102 can capture the ongoing moment at a particular point in time. For instance, the executive coaching system 102 can monitor a pulse status associated with the ongoing interaction and can determine a moment that a pulse status of a user account changed by at least a threshold amount, increased to above a threshold level, and/or decreased below a threshold level. The executive coaching system 102 can thus capture the ongoing moment and can provide the coaching insight 706 based on the ongoing moment. In cases where the executive coaching system 102 provides an ongoing moment with the coaching insight 706, the executive coaching system 102 can weight user interaction data more heavily than other signals in generating the coaching prompt 702.

Figure 8:
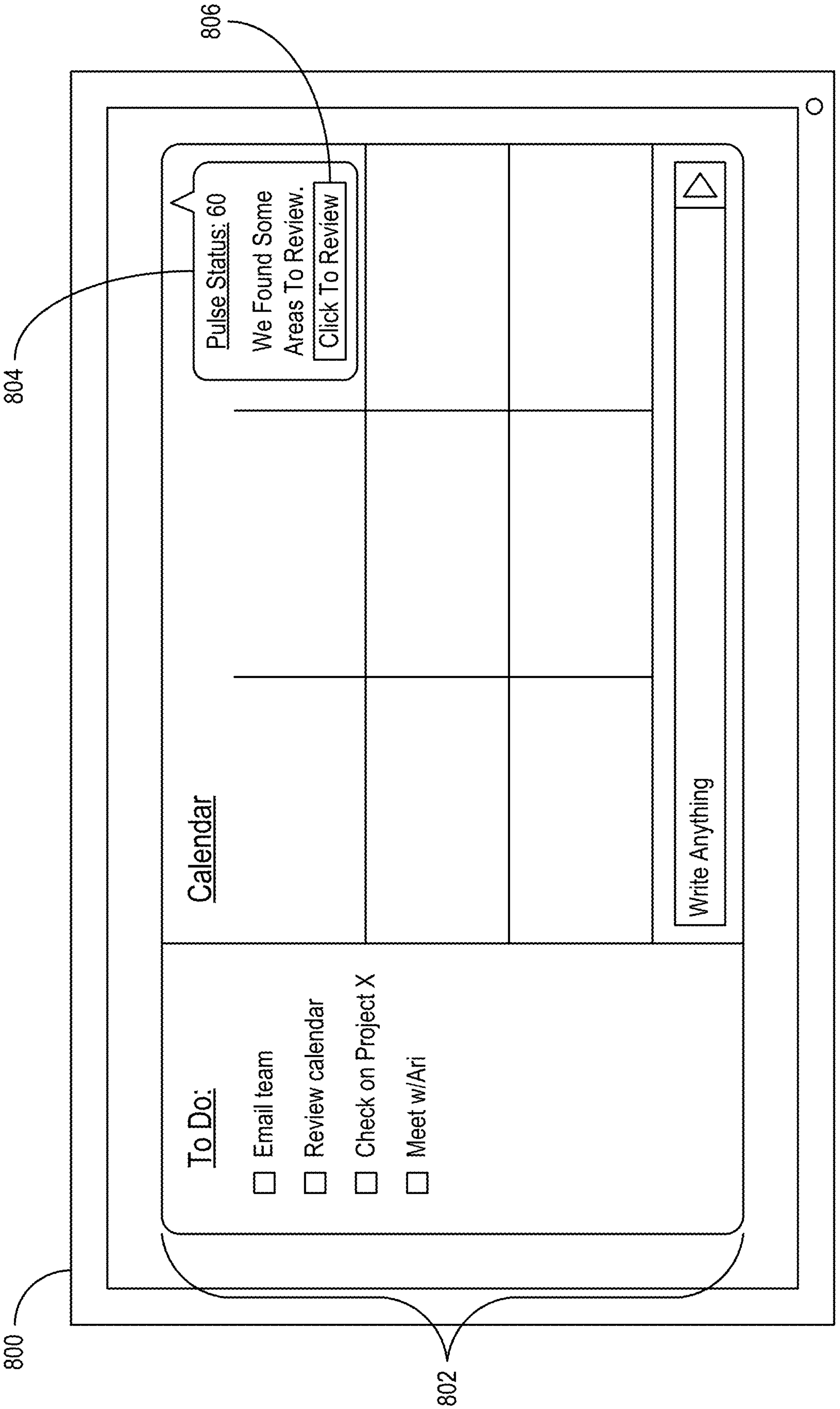
FIG. 8 illustrates an example interface for providing pulse status indicators and coaching insights in accordance with one or more embodiments.

As just mentioned, in some embodiments, the executive coaching system 102 generates a coaching insight to improve a pulse status. In particular, the executive coaching system 102 generates and provides a coaching insight for display in a graphical user interface on a client device. FIG. 8 illustrates an example interface for viewing coaching insights in accordance with one or more embodiments.

As illustrated in FIG. 8, the client device 800 displays a user interface 802 of a smart calendar interface, though any other interface for a computer application is possible. Within the user interface 802, the executive coaching system 102 generates and provides a coaching insight notification 804 for display. In particular, the executive coaching system 102 generates the coaching insight notification 804 as a push notification to pop up and indicate a pulse status (e.g., a score of 60 on a scale of 0 to 100), along with a selectable option 806 to review various coaching insights generated for the user account. In some cases, the executive coaching system 102 generates the coaching insight notification 804 on a periodic basis (e.g., at the beginning or end of each workday or week) and/or based on detecting threshold changes (or threshold levels) of a pulse status for the user account.

Figure 9A:
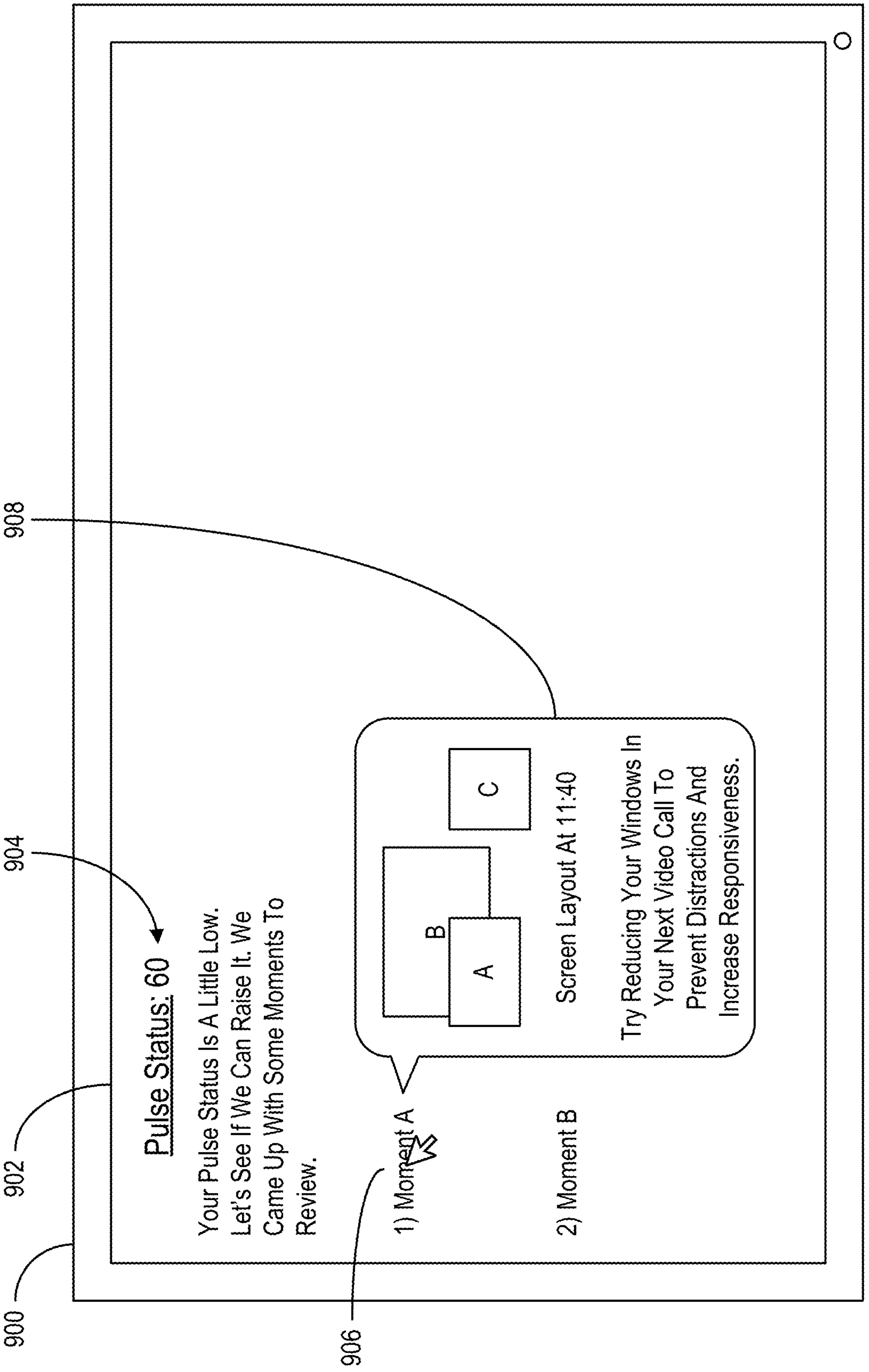
FIGS. 9A-9B illustrate example interfaces for providing coaching insights in accordance with one or more embodiments.
Figure 9B:
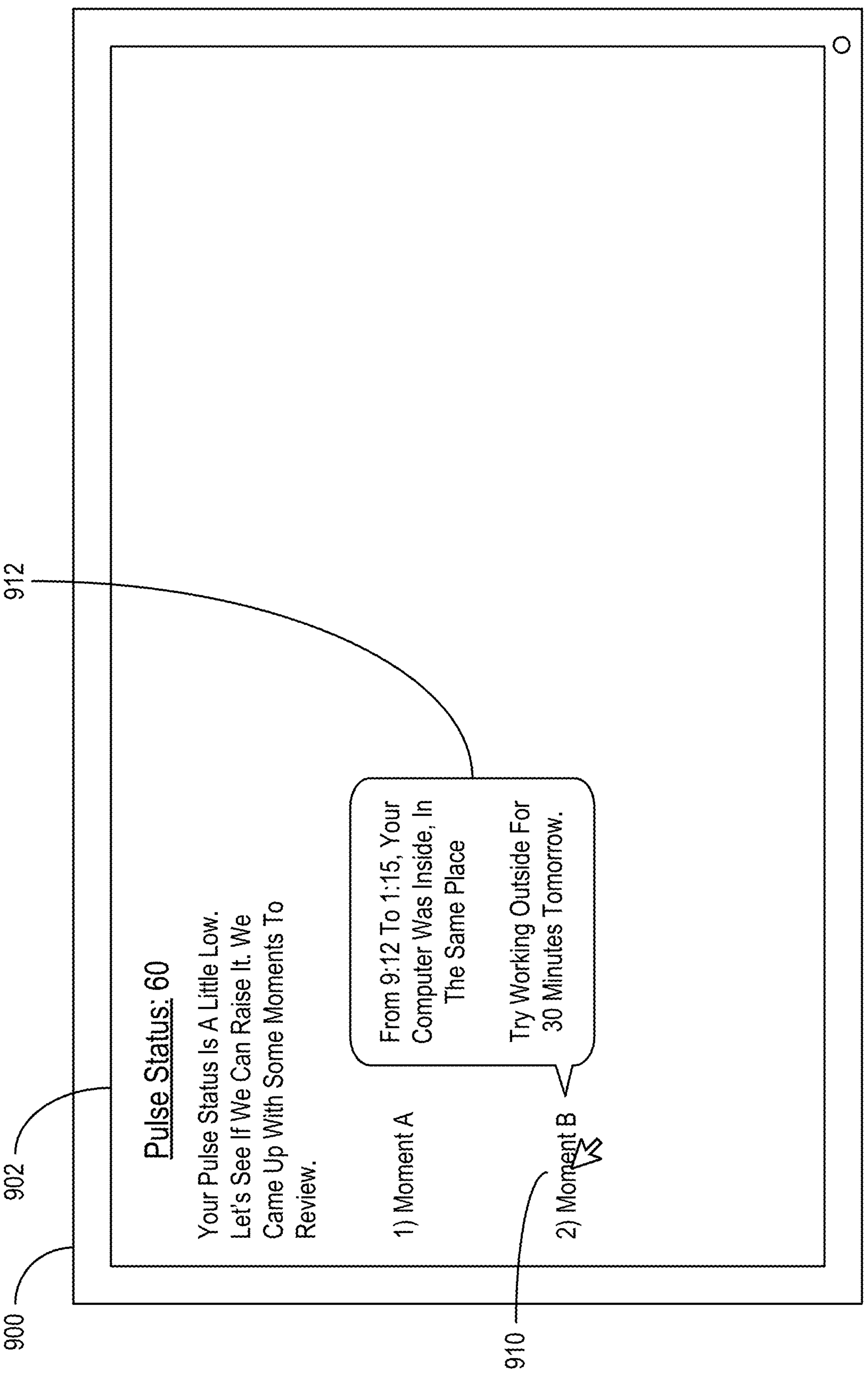
Figure 10:
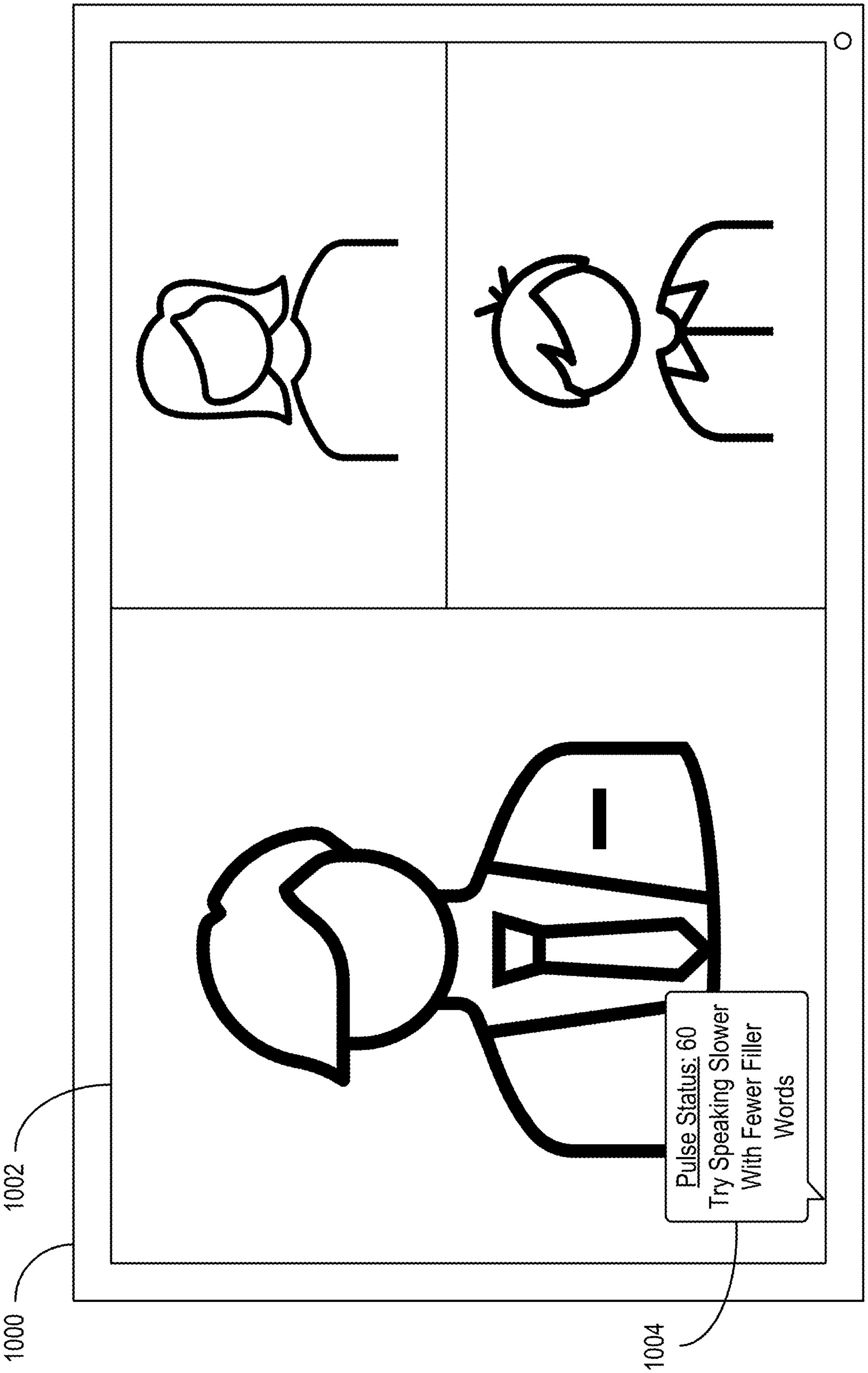
FIG. 10 illustrates an example interface for providing a coaching insight in accordance with one or more embodiments.

As noted, in some embodiments, the executive coaching system 102 provides coaching insights based on a selection of a coaching insight notification. In particular, the executive coaching system 102 provides coaching insights, along with accompanying data for various moments pertaining to the coaching insights. FIGS. 9A-9B and FIG. 10 illustrate example coaching insights associated with various moments in accordance with one or more embodiments.

As illustrated in FIG. 9A, the client device 900 displays a coaching insight interface 902. Within the coaching insight interface 902, the executive coaching system 102 generates and provides a pulse status indicator 904. Indeed, the executive coaching system 102 generates a pulse status indicator 904 to indicate a pulse status as a score from 0 to 100 (or 0 to 1), where higher numbers indicate more positive pulse statuses and lower numbers indicate more negative pulse statuses. Accompanying the pulse status indicator 904, the executive coaching system 102 can also generate and provide an explanation of the pulse status-"Your pulse status is a little low . . . ." In some cases, the executive coaching system 102 does not reveal the actual numerical score to the user but instead uses the number internally to provide explanations and coaching insights.

In addition to the pulse status indicator 904, the executive coaching system 102 also generates a coaching insight element 906 that is selectable to view a coaching insight. The coaching insight element 906 corresponds to a coaching insight for a particular moment, such as an observation layer moment ("Moment A"). Upon selection of the coaching insight element 906, the executive coaching system 102 generates and provides a coaching insight card 908 for display. Within the coaching insight card 908, the executive coaching system 102 provides a coaching insight that includes moment data and/or a recommended action for improving the pulse status. Specifically, the coaching insight card 908 includes a screenshot of application windows A, B, and C depicting content items, as captured at 11:40. The coaching insight card 908 also includes a recommended action for improving a pulse status: "Try reducing your windows in your next . . . ."

In some embodiments, the executive coaching system 102 can also automate certain behaviors based on a captured moment for a coaching insight. For instance, the executive coaching system 102 can generate an option for automatically minimizing other windows for the next video call ("Would you like me to remember to minimize your other windows for your next call with this team?"). The executive coaching system 102 can automate such actions on a context-specific bases, where automatic future actions is on a per-application basis, a per-topic basis, and/or a per-user-account basis when the executive coaching system 102 detects a similar action within the same application, about the same topic, and/or with the same user account(s).

In some cases, the coaching insight card 908 (and/or the individual observation layer windows A, B, and C) is selectable to redirect the client device 900 to open and display corresponding application windows associated with the coaching insight (and/or the captured observation layer moment). Indeed, the executive coaching system 102 can receive a selection of the coaching insight card 908 and can open each of the application windows A, B, and C along with the respective content items displayed at the time of the moment (11:40) to display the content as captured for the moment. Thus, the executive coaching system 102 provides a re-enactment of the observation layer moment for observing how and why certain changes occurred in the pulse status, as well as how to implement the recommended action provided in the coaching insight.

As illustrated in FIG. 9B, the executive coaching system 102 also generates and provides a coaching insight element 910 for display in the coaching insight interface 902. As shown, the coaching insight element 910 corresponds to a captured world state moment and is selectable to open and view a coaching insight card 912. Within the coaching insight card 912, the executive coaching system 102 generates and provides world state data corresponding to the captured world state moment which contributed to the pulse status. For instance, the executive coaching system 102 provides a notification that "From 9:12 to 1:15, your computer was inside, in the same place." To make such a determination, the executive coaching system 102 determines and monitors world state data from client device sensors over time, as described above. Indeed, the executive coaching system 102 utilizes a camera, a GPS sensor, and/or a microphone to observe the surroundings of the client device 900 to thereby determine that the client device 900 remained stationary from 9:12 to 1:15.

In addition, the executive coaching system 102 generates and provides a recommended action within the coaching insight card 912. Specifically, the executive coaching system 102 determines a recommended action to improve the pulse status based on the world state data corresponding to the coaching insight card 912. As shown, the executive coaching system 102 generates a recommended action to "Try working outside for 30 minutes tomorrow" to improve a mood and/or productivity contributing to the pulse status.

As illustrated in FIG. 10, the client device 1000 displays a video call interface 1002. Indeed, as shown, the client device 1000 is displaying video feeds from other client devices participating in an ongoing video call. As the client device 1000 streams the video feeds, the executive coaching system 102 monitors a pulse status of the user account of the client device 1000. Indeed, the executive coaching system 102 determines changes in various data sources and/or other pulse status indicators impacting the pulse status of the user account during the ongoing interaction of the video call.

Based on detecting a threshold change (or a threshold level) in a pulse status, the executive coaching system 102 generates and provides a coaching insight notification 1004 for display. In particular, the executive coaching system 102 provides a pop-up notification or a push notification that includes a coaching insight for improving a pulse status of the user account. In certain embodiments, the executive coaching system 102 can generate the coaching insight notification 1004 as an interceptor notification to intercept and correct erroneous behavior in the ongoing moment.

Indeed, the executive coaching system 102 can determine that the user account has performed erroneous behavior during the ongoing interaction based on an abrupt threshold change in pulse status. In response, the executive coaching system 102 generates the coaching insight notification 1004 to correct the erroneous behavior with a recommended action. As shown, the executive coaching system 102 detects a sudden drop in pulse status based on rapid speech and the use of many filler words (e.g., "um" or "uh") while speaking during the video call. The executive coaching system 102 thus generates the coaching insight notification 1004 for display during the video call to improve the pulse status by correcting the erroneous behavior. Other interceptor functions include warnings of rash responses (e.g., by intercepting a message or an email before it is sent) or attaching an incorrect content item to a message before sending it.

Figure 11:
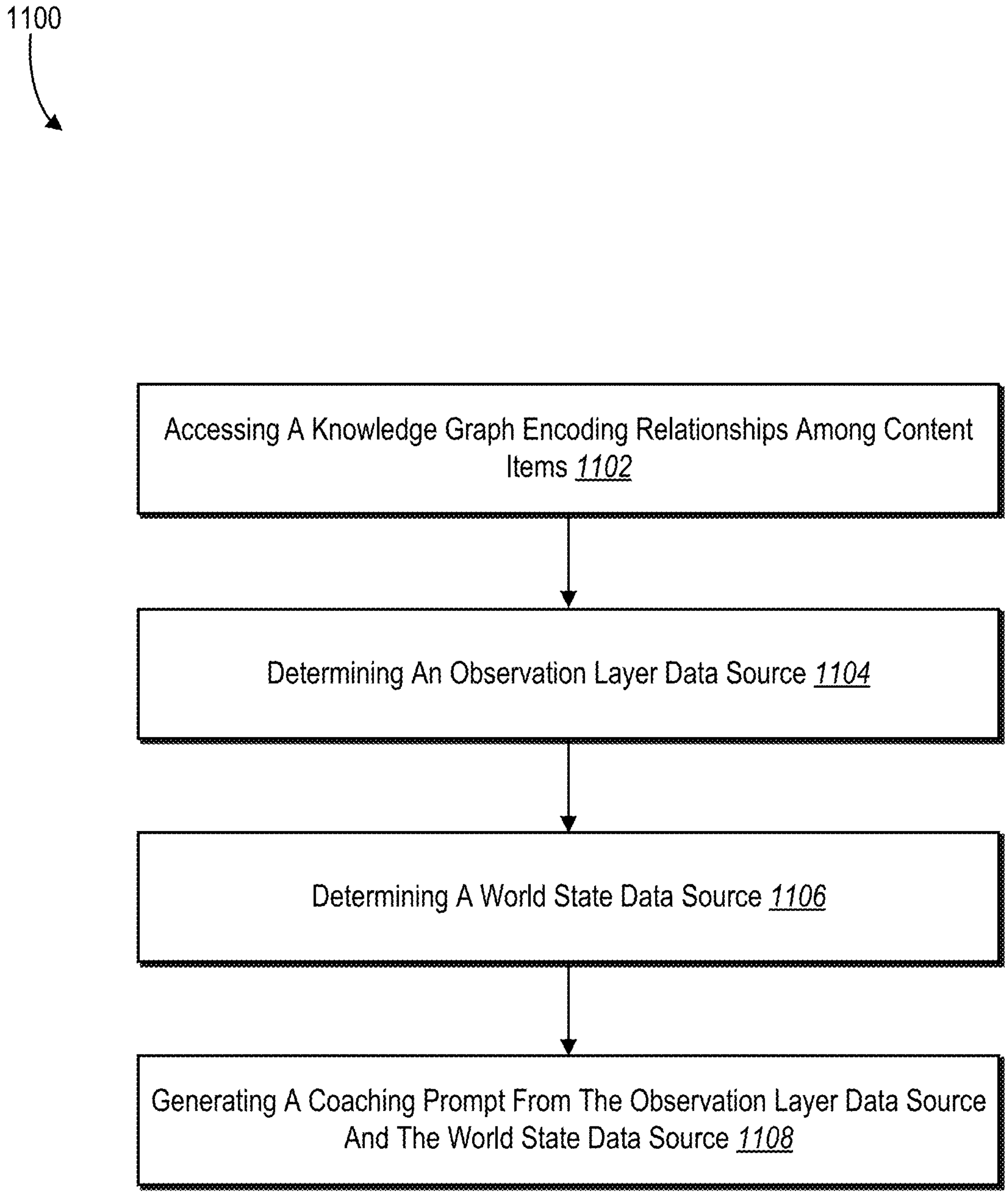
FIG. 11 illustrates an example series of acts for generating a coaching prompt from a knowledge graph in accordance with one or more embodiments.

FIGS. 1-10, the corresponding text, and the examples provide a number of different systems and methods for generating and providing coaching insights based on coaching prompts in accordance with one or more embodiments. In addition to the foregoing, implementations can also be described in terms of flowcharts comprising acts steps in a method for accomplishing a particular result. For example, FIG. 11 illustrates an example series of acts for generating a coaching prompt based on data sources encoded in a knowledge graph in accordance with one or more embodiments. Thereafter, FIG. 12 illustrates an example series of acts for generating a coaching insight from a coaching prompt to improve a pulse status of a user account in accordance with one or more embodiments.

Figure 12:
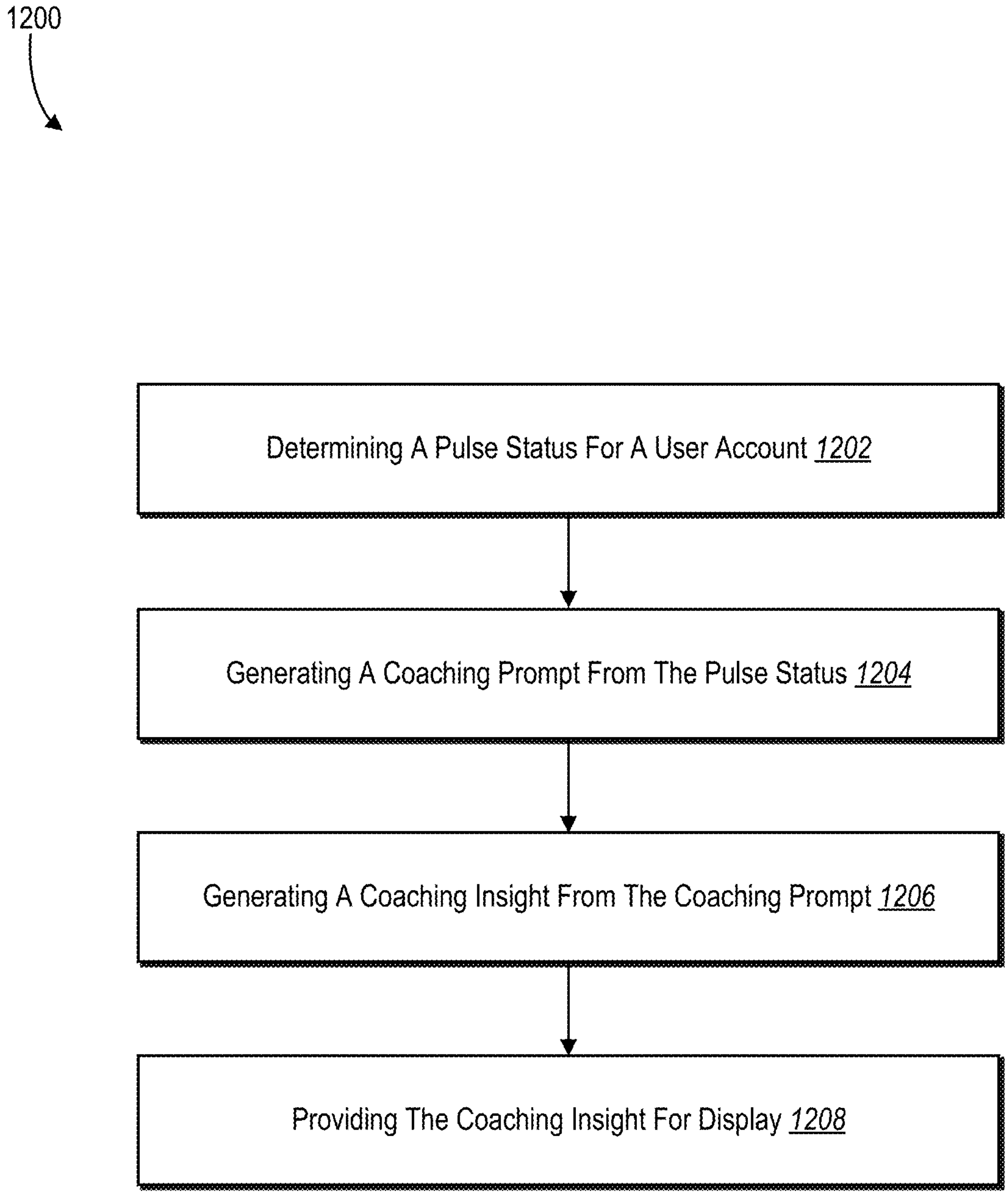
FIG. 12 illustrates an example series of acts for generating a coaching insight to improve a pulse status in accordance with one or more embodiments.

While FIGS. 11-12 illustrate acts according to certain implementations, alternative implementations may omit, add to, reorder, and/or modify any of the acts shown in FIGS. 11-12. The acts of FIGS. 11-12 can be performed as part of a method. Alternatively, a non-transitory computer readable medium can comprise instructions, that when executed by one or more processors, cause a computing device to perform the acts of FIGS. 11-12. In still further implementations, a system can perform the acts of FIGS. 11-12.

As illustrated in FIG. 11, the series of acts 1100 may include an act 1102 of accessing a knowledge graph encoding relationships among content items. In particular, the act 1102 involves accessing a knowledge graph that encodes relationships among content items stored for a user account within a content management system according to a plurality of data sources. In addition, the series of acts 1100 includes an act 1104 of determining an observation layer data source. In particular, the act 1104 involves determining, from among the plurality of data sources informing the knowledge graph, an observation layer data source defining data extracted from digital content presented via a client device associated with the user account. Further, the series of acts 1100 includes an act 1106 of determining a world state data source. In particular, the act 1106 involves determining, from among the plurality of data sources informing the knowledge graph, a world state data source defining device metrics from sensors of the client device. As shown, the series of acts 1100 includes an act 1108 of generating a coaching prompt from the observation layer data source and the world state data source. In particular, the act 1108 involves generating, for providing to a large language model, a coaching prompt comprising instructions informed by the observation layer data source and the world state data source.

In some embodiments, the series of acts 1100 includes an act of determining the observation layer data source by determining a relationship between a first content item and a second content item presented via the client device. In these or other embodiments, the series of acts 1100 includes an act of generating, from the knowledge graph, a dependency map linking content items extracted from the plurality of data sources to a plurality of executable processes that combine to accomplish a target objective and an act of generating, based on the dependency map, the coaching prompt to include instructions from a content item linked to accomplishing an executable process from among the plurality of executable processes.

The series of acts 1100 can include an act of determining the world state data source by: determining, for the client device associated with the user account, the device metrics indicating operating system settings and physical measurements from device sensors and determining environmental metrics indicating environmental surroundings of the client device. In addition, the series of acts 1100 can include an act of generating the coaching prompt by: generating first instruction language from one or more content items extracted via the observation layer data source, generating second instruction language from one or more of device metrics or environment metrics extracted via the world state data source, and combining the first instruction language and the second instruction language into the coaching prompt.

In one or more embodiments, the series of acts 1100 includes acts of utilizing a software connector to extract content data from a computer application used by the user account via an application integration with the computer application and generating the coaching prompt to include instruction language based on the content data extracted using the software connector. Further, the series of acts 1100 can include an act of generating, utilizing the large language model to process the coaching prompt, a coaching insight that includes a recommendation for modifying time spend associated with the user account.

In some embodiments, the series of acts 1100 includes an act of determining, from among the plurality of data sources informing the knowledge graph, a world state data source defining device metrics and environmental metrics of the client device. In addition, the series of acts 1100 includes an act of generating the coaching prompt instructing the large language model to generate a coaching insight comprising a recommendation for modifying time spend of the user account based on the observation layer data source and the world state data source. Further, the series of acts 1100 includes acts of determining a target objective for the user account, wherein the target objective is accomplishable by performing a series of executable processes, generating, from the knowledge graph, a dependency map linking the series of executable processes of the target objective to content items extracted from the plurality of data sources, and generating the coaching prompt to include instructions based on the content items linked to the series of executable process in the dependency map.

In one or more embodiments, the series of acts 1100 includes an act of determining the world state data source by determining the device metrics indicating one or more of device temperature, movement, or orientation from sensors of the client device and an act of generating the coaching prompt from the device metrics determined from the sensors of the client device. The series of acts 1100 can also include acts of determining the world state data source by determining, for the client device, environmental metrics indicating one or more of lighting conditions, ambient noise, or physical position of the client device relative to a user and generating the coaching prompt from the environmental metrics of the client device.

In some cases, the series of acts 1100 can include an act of determining the observation layer data source by determining a relationship between a first content item and a second content item presented via the client device and an act of generating the coaching prompt based on the relationship between the first content item and the second content item. In addition, the series of acts 1100 can include an act of determining a user interaction data source that defines user account activity with content items stored within the content management system and an act of generating the coaching prompt based on the user account activity with the content items.

In some embodiments, the series of acts 1100 includes an act of determining, from among the plurality of data sources informing the knowledge graph, an observation layer data source defining one or more content items presented via a client device associated with the user account. In addition, the series of acts 1100 can include an act of determining, from a user interaction data source associated with the user account, a target objective for the user account, wherein the target objective is accomplishable by performing a series of executable processes. The series of acts 1100 can also include an act of generate the coaching prompt to include instructions for performing an executable process from among the series of executable processes combinable to accomplish the target objective.

The series of acts 1100 can also include an act of determining the world state data source by determining, based on readings from the sensors of the client device, environmental metrics indicating lighting conditions, ambient noise, and physical position of the client device relative to a user. The series of acts 1100 can also include an act of generating the knowledge graph from the observation layer data source and the world state data source. Further, the series of acts 1100 can include an act of generating a dependency map from the knowledge graph, wherein the dependency map comprises mappings indicating content items stored in the content management system that include data corresponding to a series of executable processes for accomplishing a target objective. In some cases, the series of acts 1100 can include an act of generating the coaching prompt from the dependency map to include at least a portion of the data corresponding to the series of executable processes.

As illustrated in FIG. 12, the series of acts 1200 may include an act 1202 of determining a pulse status for a user account. In particular, the act 1202 involves determining, from one or more data sources indicating activity of a user account, a pulse status defining a measure of productivity of the user account relative to a predefined objective of the user account. In addition, the series of acts 1200 includes an act 1204 of generating a coaching prompt from the pulse status. In particular, the act 1204 involves generating, based on the pulse status of the user account, a coaching prompt comprising instructions to generate a suggestion for improving the pulse status of the user account. Further, the series of acts 1200 includes an act 1206 of generating a coaching insight from the coaching prompt. In particular, the act 1206 involves generating, utilizing a large language model to process the coaching prompt, a coaching insight comprising a recommended action for improving the pulse status of the user account. As shown, the series of acts 1200 includes an act 1208 of providing the coaching insight for display. In particular, the act 1208 involves providing the coaching insight for display on a client device associated with the user account.

The series of acts 1200 can include an act of determining the pulse status by: generating a pulse status prompt from observation layer data defining content items presented on the client device and from world state data defining device metrics from sensors of the client device; and utilizing the large language model to generate the pulse status from the pulse status prompt. In addition, the series of acts 1200 can include an act of determining the predefined objective of the user account by receiving, from the client device, an indication of a target objective made up of a plurality of executable processes that, when performed, accomplish the target objective. Further, the series of acts 1200 can include an act of generating the coaching prompt by generating text that instructs the large language model, wherein the text includes terms from an observation layer data source and terms from a world state data source.

In some embodiments, the series of acts 1200 includes an act of generating the coaching insight by utilizing the large language model to generate, from the coaching prompt, text defining the recommended action in a format based on one or more of the observation layer data source or the world state data source. The series of acts 1200 can also include an act of providing the coaching insight for display by providing, for display on the client device, a coaching insight interface comprising the coaching insight and one or more cards selectable to redirect the client device to computer applications corresponding to the coaching insight. Additionally, the series of acts 1200 can include an act of modifying parameters of the large language model based on sample executive data defining ground truth coaching insights for sample coaching prompts.

In one or more embodiments, the series of acts 1200 includes an act of determining, from an observation layer data source and a world state data source associated with a user account, a pulse status defining a measure of productivity of the user account relative to a predefined objective of the user account. In addition, the series of acts 1200 includes an act of decomposing the predefined objective into a series of executable processes that, when performed, accomplish the predefined objective and an act of determining the pulse status by determining a measure of accomplishment of an executable process from among the series of executable processes.

The series of acts 1200 can also include an act of generating the coaching prompt to include text representing first data from the observation layer data source and second data from the world state data source and an act of generating, utilizing the large language model to process the coaching prompt, the coaching insight to intercept erroneous behavior of the user account indicated by the first data and the second data. Further, the series of acts 1200 can include an act of generating the coaching insight by: capturing, from the world state data source, a world state moment comprising a state of environmental metrics associated with the client device at a point in time; and generating a text description of the recommended action corresponding to improving the pulse status in relation to the world state moment.

In one or more embodiments, the series of acts 1200 includes an act of providing the coaching insight for display by providing a coaching insight interface that depicts the world state moment together with the coaching insight. In some cases, the observation layer data source indicates content items presented in application windows on the client device over time, and the world state data source indicates device metrics and environmental metrics associated with the client device. The series of acts 1200 can include an act of generating the coaching insight by generating a suggestion to improve an ongoing interaction associated with the user account based on the coaching prompt indicating observation layer data and world state data for the ongoing interaction.

In some embodiments, the series of acts 1200 includes an act of providing the coaching insight for display within a coaching insight interface presented on a client device associated with the user account. In addition, the series of acts 1200 includes an act of determining the pulse status by: determining the measure of productivity in relation to accomplishing an executable process included in a series of executable processes that make up the predefined objective; comparing the measure of productivity with previous measures of productivity associated with the user account; and generating the pulse status based on comparing the measure of productivity with the previous measures of productivity.

In certain cases, the series of acts 1200 includes an act of generating the coaching prompt by generating text that includes terms based on an observation layer data source and a world state data source from among the one or more data sources. Additionally, the series of acts 1200 includes an act of generating the coaching insight by utilizing the large language model to generate, from the coaching prompt, the coaching insight in a format based on an observation layer data source and a world state data source from among the one or more data sources. Further, the series of acts 1200 includes an act of generating the coaching insight by: capturing, from an observation layer data source of the one or more data sources, an observation layer moment comprising a presentation of digital content depicted across a set of application interfaces on the client device at a point in time; and generating a text description of the recommended action corresponding to improving the pulse status in relation to the observation layer moment. In some embodiments, the series of acts 1200 includes an act of providing the coaching insight for display by providing a coaching insight interface that depicts the observation layer moment together with the coaching insight.

The components of the executive coaching system 102 can include software, hardware, or both. For example, the components of the executive coaching system 102 can include one or more instructions stored on a computer-readable storage medium and executable by processors of one or more computing devices. When executed by one or more processors, the computer-executable instructions of the executive coaching system 102 can cause a computing device to perform the methods described herein. Alternatively, the components of the executive coaching system 102 can comprise hardware, such as a special purpose processing device to perform a certain function or group of functions. Additionally or alternatively, the components of the executive coaching system 102 can include a combination of computer-executable instructions and hardware.

Furthermore, the components of the executive coaching system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the executive coaching system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
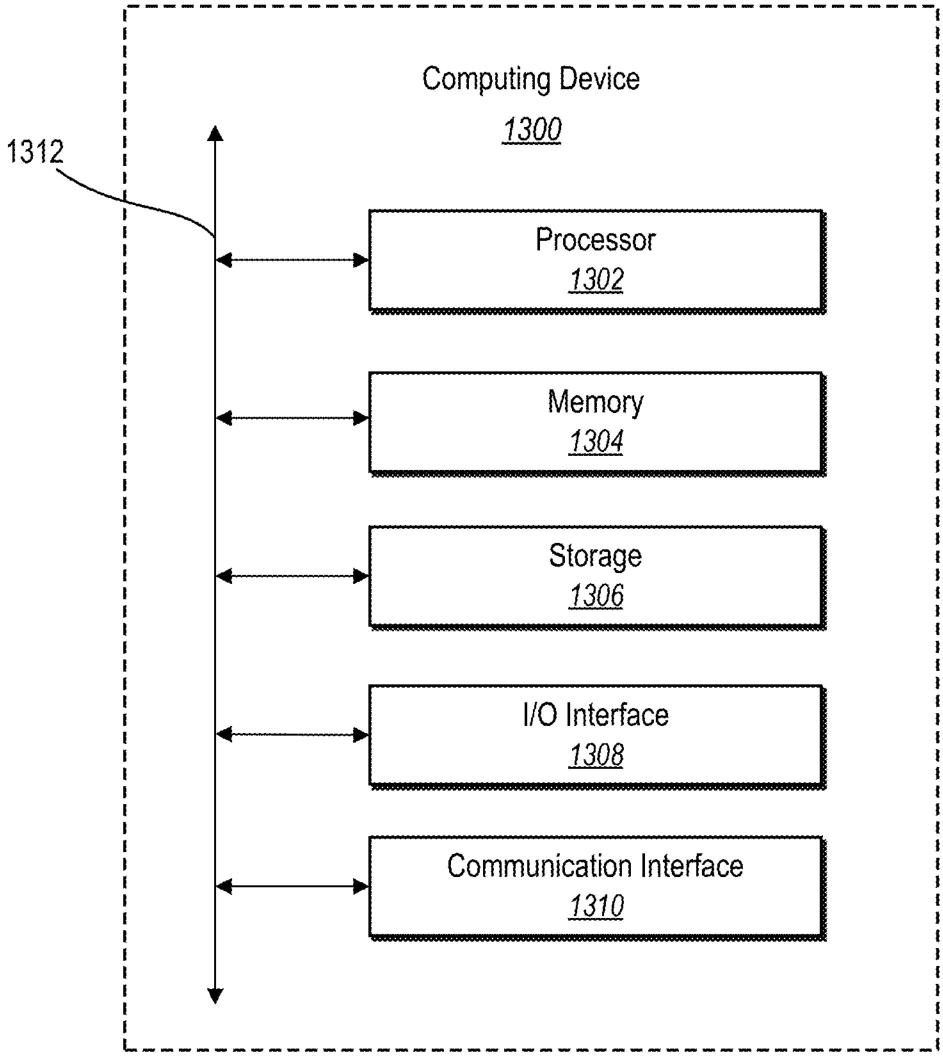
FIG. 13 illustrates a block diagram of an exemplary computing device in accordance with one or more embodiments.

FIG. 13 illustrates a block diagram of exemplary computing device 1300 (e.g., the server(s) 104 and/or the client device 108) that may be configured to perform one or more of the processes described above. One will appreciate that server(s) 104 and/or the client device 108 may comprise one or more computing devices such as computing device 1300. As shown by FIG. 13, computing device 1300 can comprise processor 1302, memory 1304, storage device 1306, I/O interface 1308, and communication interface 1310, which may be communicatively coupled by way of communication infrastructure 1312. While an exemplary computing device 1300 is shown in FIG. 13, the components illustrated in FIG. 13 are not intended to be limiting. Additional or alternative components may be used in other implementations. Furthermore, in certain implementations, computing device 1300 can include fewer components than those shown in FIG. 13. Components of computing device 1300 shown in FIG. 13 will now be described in additional detail.

In particular implementations, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage device 1306 and decode and execute them. In particular implementations, processor 1302 may include one or more internal caches for data, instructions, or addresses. As an example and not by way of limitation, processor 1302 may include one or more instruction caches, one or more data caches, and one or more translation lookaside buffers (TLBs). Instructions in the instruction caches may be copies of instructions in memory 1304 or storage device 1306.

Memory 1304 may be used for storing data, metadata, and programs for execution by the processor(s). Memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1304 may be internal or distributed memory.

Storage device 1306 includes storage for storing data or instructions. As an example and not by way of limitation, storage device 1306 can comprise a non-transitory storage medium described above. Storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to computing device 1300. In particular implementations, storage device 1306 is non-volatile, solid-state memory. In other implementations, Storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1308 allows a user to provide input to, receive output from, and otherwise transfer data to and receive data from computing device 1300. I/O interface 1308 may include a mouse, a keypad or a keyboard, a touch screen, a camera, an optical scanner, network interface, modem, other known I/O devices or a combination of such I/O interfaces. I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1308 is configured to provide graphical data to a display for presentation to a user. The graphical data may be representative of one or more graphical user interfaces and/or any other graphical content as may serve a particular implementation.

Communication interface 1310 can include hardware, software, or both. In any event, communication interface 1310 can provide one or more interfaces for communication (such as, for example, packet-based communication) between computing device 1300 and one or more other computing devices or networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1312 may include hardware, software, or both that couples components of computing device 1300 to each other. As an example and not by way of limitation, communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 14:
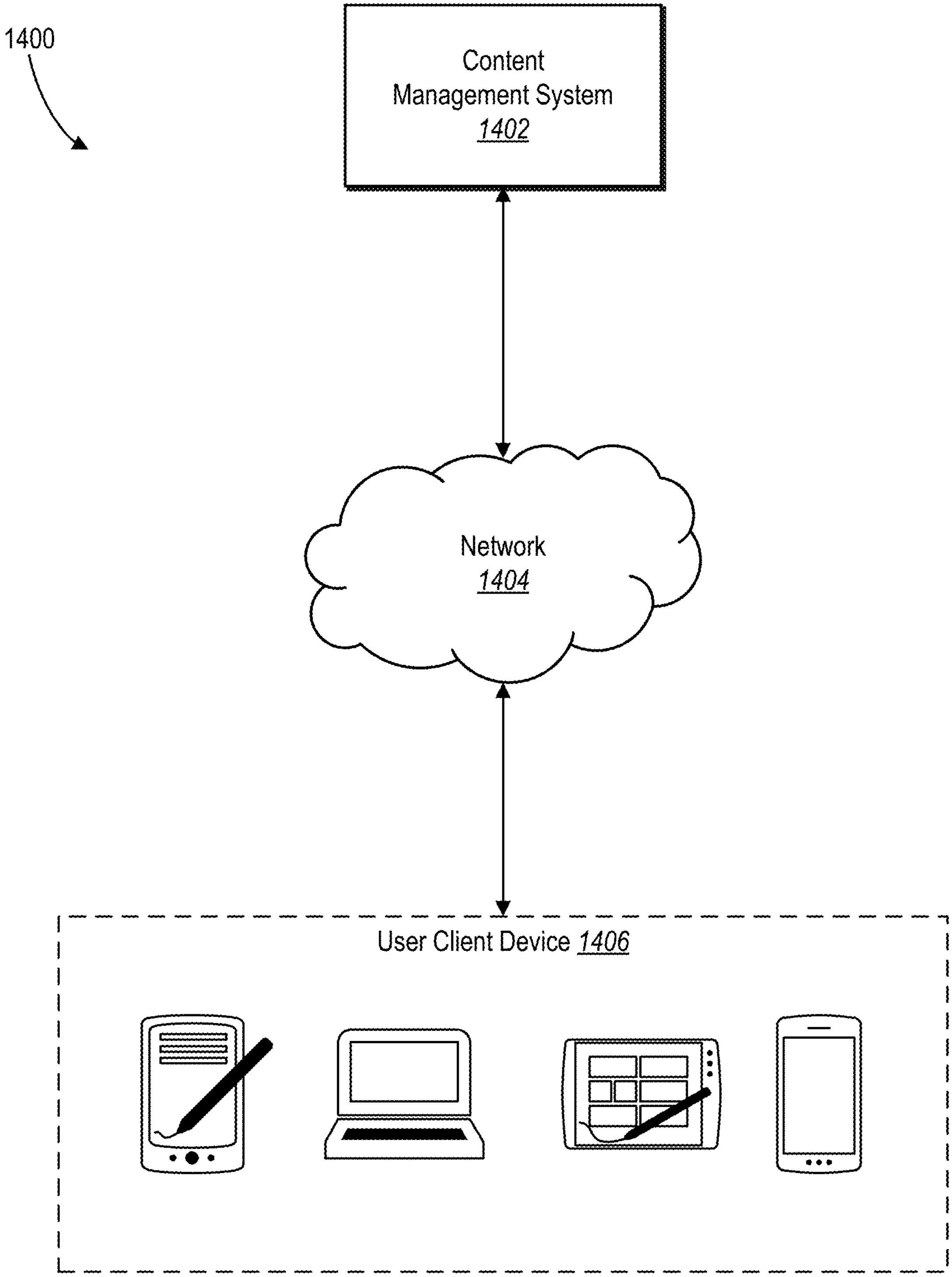
FIG. 14 illustrates an example environment of a networking system having the executive coaching system in accordance with one or more embodiments.

FIG. 14 is a schematic diagram illustrating environment 1400 within which one or more implementations of the executive coaching system 102 can be implemented. For example, the executive coaching system 102 may be part of a content management system 1402 (e.g., the content management system 106). Content management system 1402 may generate, store, manage, receive, and send digital content (such as digital content items). For example, content management system 1402 may send and receive digital content to and from client devices 1406 by way of network 1404. In particular, content management system 1402 can store and manage a collection of digital content. Content management system 1402 can manage the sharing of digital content between computing devices associated with a plurality of users. For instance, content management system 1402 can facilitate a user sharing a digital content with another user of content management system 1402.

In particular, content management system 1402 can manage synchronizing digital content across multiple client devices 1406 associated with one or more users. For example, a user may edit digital content using client device 1406. The content management system 1402 can cause client device 1406 to send the edited digital content to content management system 1402. Content management system 1402 then synchronizes the edited digital content on one or more additional computing devices.

In addition to synchronizing digital content across multiple devices, one or more implementations of content management system 1402 can provide an efficient storage option for users that have large collections of digital content. For example, content management system 1402 can store a collection of digital content on content management system 1402, while the client device 1406 only stores reduced-sized versions of the digital content. A user can navigate and browse the reduced-sized versions (e.g., a thumbnail of a digital image) of the digital content on client device 1406. In particular, one way in which a user can experience digital content is to browse the reduced-sized versions of the digital content on client device 1406.

Another way in which a user can experience digital content is to select a reduced-size version of digital content to request the full- or high-resolution version of digital content from content management system 1402. In particular, upon a user selecting a reduced-sized version of digital content, client device 1406 sends a request to content management system 1402 requesting the digital content associated with the reduced-sized version of the digital content. Content management system 1402 can respond to the request by sending the digital content to client device 1406. Client device 1406, upon receiving the digital content, can then present the digital content to the user. In this way, a user can have access to large collections of digital content while minimizing the amount of resources used on client device 1406.

Client device 1406 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1406 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1404.

Network 1404 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1406 may access content management system 1402.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system comprising:

at least one processor; and a non-transitory computer readable medium comprising instructions that, when executed by the at least one processor, cause the system to:

receive user interactions associated with a client device associated with a user account;

generate a current interaction pattern based on the user interactions;

determine, using a large language model, that the current interaction pattern deviates from an established interaction pattern;

determine a change from a first context that corresponds to the established interaction pattern to a second context; identify an additional established interaction pattern that corresponds to the second context; determine, using the large language model, that the current interaction pattern deviates from the additional established interaction pattern that corresponds to the second context;

determine, using the large language model, a suggested action that, when taken at the client device, causes the current interaction pattern to better align with the established interaction pattern; and provide, for display on the client device, an interceptor notification comprising the suggested action.

2. The system of claim 1, further comprising instructions that, when executed by the at least one processor, cause the system to generate the established interaction pattern based on monitoring user interactions during a known context.

3. The system of claim 1, further comprising instructions that, when executed by the at least one processor, cause the system to:

detect erroneous behavior of the user account based on determining the current interaction pattern deviates from the established interaction pattern; and wherein determining the suggested action comprises identifying an action to intercept the erroneous behavior.

4. The system of claim 1, wherein:

the established interaction pattern is based at least in part on a frequency of previous context switching signals for the user account; and the current interaction pattern is based at least in part on a frequency of current context switching signals.

5. The system of claim 1, wherein receiving the user interactions associated with the client device comprises receiving interaction signals from:

an observation layer data source associated with the client device, the observation layer data source indicating content items presented in application windows on the client device; and a world state data source associated with the client device, the world state data source indicating device metrics and environmental metrics associated with the client device.

6. The system of claim 1, further comprising instructions that, when executed by the at least one processor, cause the system to determine the suggested action using the large language model based on timing data associated with the change from the first context to the second context.

7. The system of claim 1, wherein:
- the current interaction pattern comprises text input via the client device; and
- determining the current interaction pattern deviates from the established interaction pattern is based in part on determining the text input via the client device indicates a tone deviation when compared to a tone associated with the established interaction pattern.

8. A computer-implemented method, comprising:
- monitoring user interactions associated with a client device associated with a user account;
- generating, for a timeframe, a current interaction pattern comprising a set of user interactions from the user interactions;
- determining, using a large language model, that the current interaction pattern deviates from an established interaction pattern;
- determining a change from a first context that corresponds to the established interaction pattern to a second context; identifying an additional established interaction pattern that corresponds to the second context; determining, using the large language model, that the current interaction pattern deviates from the additional established interaction pattern that corresponds to the second context; and
- providing, for display on the client device, an interceptor notification comprising a suggestion to change the current interaction pattern to align with the established interaction pattern.

9. The computer-implemented method of claim 8, further comprising:
- generating, for the user account, a first interaction pattern for a first context by monitoring a first plurality of user interactions with the client device while the client device is operating in the first context;
- generating, for the user account, a second interaction pattern for a second context by monitoring a second plurality of user interactions with the client device while the client device is operating in the second context; and
- determining that the established interaction pattern is either the first interaction pattern or the second interaction pattern based on determining whether the client device is operating in either the first context or the second context.

10. The computer-implemented method of claim 8, wherein:
- the established interaction pattern is based at least in part on previous context switching signals for the user account; and
- the current interaction pattern is based at least in part on current context switching signals.

11. The computer-implemented method of claim 8, wherein monitoring the user interactions associated with the client device comprises receiving interaction signals from an observation layer data source associated with the client device.

12. The computer-implemented method of claim 8, further comprising generating, utilizing the large language model, text for the suggestion based on the large language model determining the current interaction pattern deviates from the established interaction pattern.

13. The computer-implemented method of claim 8, further comprising determining the suggestion for the interceptor notification using the large language model based on timing data associated with the change from the first context to the second context.

14. The computer-implemented method of claim 8, wherein,
- the current interaction pattern comprises text input via the client device; and
- determining the current interaction pattern deviates from the established interaction pattern is based in part on determining the text input via the client device indicates a tone deviation when compared to a tone associated with the established interaction pattern.

15. A non-transitory computer readable medium comprising instructions that, when executed by at least one processor, cause a computing device to:
- generate a current interaction pattern based on user interactions received from a client device associated with a user account;
- determine, using a large language model, that the current interaction pattern deviates from an established interaction pattern;
- determine a change from a first context that corresponds to the established interaction pattern to a second context; identify an additional established interaction pattern that corresponds to the second context; determine, using the large language model, that the current interaction pattern deviates from the additional established interaction pattern that corresponds to the second context;
- determine, using the large language model, a suggested action that, when implemented at the client device, causes the current interaction pattern to align with the established interaction pattern; and
- provide, for display on the client device, an interceptor notification comprising the suggested action.

16. The non-transitory computer readable medium of claim 15, further comprising instructions that, when executed by the at least one processor, cause the computing device to:
- detect erroneous behavior of the user account based on determining the current interaction pattern deviates from the established interaction pattern; and
- wherein determining the suggested action comprises identifying an action to intercept the erroneous behavior.

17. The non-transitory computer readable medium of claim 15, wherein:
- the established interaction pattern is based at least in part on a number of previous context switching signals for the user account; and
- the current interaction pattern is based at least in part on a number of current context switching signals.

18. The non-transitory computer readable medium of claim 15, wherein the user interactions are based on interaction signals received from:
- an observation layer data source associated with the client device, the observation layer data source indicating content items presented in application windows on the client device; and
- a world state data source associated with the client device, the world state data source indicating device metrics and environmental metrics associated with the client device.

19. The non-transitory computer readable medium of claim 15, further comprising instructions that, when executed by the at least one processor, cause the computing device to determine the suggested action using the large language model based on timing data associated with the change from the first context to the second context.

20. The non-transitory computer readable medium of claim 15, further comprising instructions that, when executed by the at least one processor, cause the computing device to generate, utilizing the large language model, text for the suggested action based on the large language model determining the current interaction pattern deviates from the established interaction pattern.

* * * * *